US009607241B2

(12) United States Patent
Rivet-Sabourin

(10) Patent No.: US 9,607,241 B2
(45) Date of Patent: Mar. 28, 2017

(54) CONCURRENT ACTIVE CONTOUR SEGMENTATION

(71) Applicant: LABORATOIRES BODYCAD INC., Québec (CA)

(72) Inventor: Geoffroy Rivet-Sabourin, Stoneham (CA)

(73) Assignee: LABORATORIES BODYCAD INC., Quebec, Quebec (CA)

( * ) Notice: Subject to any disclaimer, the term of this patent is extended or adjusted under 35 U.S.C. 154(b) by 0 days.

(21) Appl. No.: 14/782,826

(22) PCT Filed: Apr. 9, 2014

(86) PCT No.: PCT/CA2014/000340
§ 371 (c)(1),
(2) Date: Oct. 7, 2015

(87) PCT Pub. No.: WO2014/165972
PCT Pub. Date: Oct. 16, 2014

(65) Prior Publication Data
US 2016/0070973 A1  Mar. 10, 2016

Related U.S. Application Data

(60) Provisional application No. 61/809,942, filed on Apr. 9, 2013.

(51) Int. Cl.
G06K 9/46 (2006.01)
G06T 7/60 (2006.01)
(Continued)

(52) U.S. Cl.
CPC ......... *G06K 9/4604* (2013.01); *G06K 9/4661* (2013.01); *G06K 9/52* (2013.01);
(Continued)

(58) Field of Classification Search
CPC ................. G06T 7/0083; G06T 7/0089; G06T 2207/10072; G06T 2207/20104;
(Continued)

(56) References Cited

U.S. PATENT DOCUMENTS 6,078,688 A  6/2000  Cox et al.
6,980,682 B1  12/2005  Avinash et al.
(Continued)

FOREIGN PATENT DOCUMENTS

WO  03/041584 A2  5/2003

OTHER PUBLICATIONS

Pohle et al., Segmentation of medical images using adaptative region growing, SPIE Proceedings, vol. 4322, Medical Imaging 2001: Image Processing, 1337, Jul. 3, 2001.
(Continued)

*Primary Examiner* — Kim Vu
*Assistant Examiner* — Pinalben Patel
(74) *Attorney, Agent, or Firm* — Eversheds Sutherland (US) LLP

(57) ABSTRACT

A system and method for active contour segmentation. An image of a first and at least a second structure, a first position for the first structure, and at least a second position for the at least second structure are received, the first and the at least second positions are set as a first and an at least second initial contour, and the first and the at least second initial contours are concurrently and iteratively deformed to respectively expand into a first and at least a second expanded contour matching a shape of the first and the at least second structure by applying constraints to each point of the first and the at least second initial contour, comprising a constraint for preventing the first and at least one of the at least second
(Continued)

initial contour from intersecting one another upon being deformed, and the constraints are updated after each iteration.

26 Claims, 22 Drawing Sheets

(51) Int. Cl.
  *G06K 9/52* (2006.01)
  *G06T 7/00* (2006.01)
  *G06K 9/62* (2006.01)
(52) U.S. Cl.
  CPC .......... *G06K 9/6201* (2013.01); *G06T 7/0042* (2013.01); *G06T 7/0083* (2013.01); *G06T 7/0085* (2013.01); *G06T 7/0089* (2013.01); *G06T 7/60* (2013.01); *G06T 2207/10072* (2013.01); *G06T 2207/20104* (2013.01); *G06T 2207/20112* (2013.01); *G06T 2207/20116* (2013.01); *G06T 2207/30008* (2013.01)
(58) Field of Classification Search
  CPC . G06T 2207/20116; G06T 2207/30008; G06T 7/60; G06T 7/0085; G06T 7/0042; G06T 2207/20112; G06K 9/6201; G06K 9/52; G06K 9/4661; G06K 9/4604
  See application file for complete search history.

(56) References Cited

U.S. PATENT DOCUMENTS

| | | | |
|---|---|---|---|
| 7,043,290 B2 | 5/2006 | Young et al. | |
| 7,587,073 B2 | 9/2009 | Park | |
| 7,925,064 B2 | 4/2011 | Cloutier et al. | |
| 7,925,087 B2 | 4/2011 | Slabaugh et al. | |
| 7,929,739 B2 | 4/2011 | Li | |
| 7,953,266 B2 | 5/2011 | Gulsun et al. | |
| 8,031,919 B2 | 10/2011 | Eskildsen et al. | |
| 8,160,345 B2 | 4/2012 | Pavlovskaia et al. | |
| 8,253,802 B1 | 8/2012 | Anderson et al. | |
| 8,401,305 B2 | 3/2013 | Kido | |
| 8,406,527 B2 | 3/2013 | Kido | |
| 8,515,171 B2 | 8/2013 | Vantaram et al. | |
| 8,995,790 B2 | 3/2015 | Mueller et al. | |
| 9,122,951 B2 | 9/2015 | Lee et al. | |
| 9,336,587 B2 | 5/2016 | Shibahara et al. | |
| 2005/0111732 A1* | 5/2005 | Mallya .................... | A61B 6/00 382/173 |
| 2005/0113679 A1 | 5/2005 | Suryanarayanan et al. | |
| 2006/0013482 A1 | 1/2006 | Dawant et al. | |
| 2008/0044072 A1* | 2/2008 | Kiraly .................... | G06K 9/342 382/128 |
| 2008/0112617 A1* | 5/2008 | Slabaugh ............. | G06K 9/6207 382/173 |
| 2008/0171932 A1 | 7/2008 | Yan et al. | |
| 2009/0190815 A1* | 7/2009 | Dam ....................... | A61B 5/055 382/131 |
| 2010/0153081 A1* | 6/2010 | Bellettre ................ | A61B 34/10 703/11 |
| 2011/0123090 A1 | 5/2011 | Zerfass et al. | |
| 2011/0262054 A1 | 10/2011 | Benson et al. | |
| 2013/0033419 A1 | 2/2013 | Dror et al. | |
| 2015/0030219 A1* | 1/2015 | Madabhushi ......... | G06T 7/0083 382/128 |
| 2015/0302601 A1 | 10/2015 | Rivet-Sabourin | |
| 2015/0324999 A1 | 11/2015 | Gritsenko et al. | |
| 2016/0070973 A1 | 3/2016 | Rivet-Sabourin | |

OTHER PUBLICATIONS

Mao et al., Color image segmentation method based on region growing and ant colony clustering, WRI Global Congress on Intelligent Systems, p. 173-177, May 19, 2009.

Tilton, J.C., Image segmentation by region growing and spectral clustering with a neural convergence criterion, Proceedings of the 1998 Geoscience and remote sensing symposium (ICGARSS. '98) Jul. 6, 1998.

Schnabel, Julia A. et al; "Active shape focusing."; Image and Vision Computing; (1999); pp. 419-428; vol. 17.5.

Papari, Giuseppe, et al. "A biologically motivated multiresolution approach to contour detection." EURASIP Journal on Applied Signal Processing (2007), Article ID 71828, 28 pages.

Cohen L D et al.; "Finite-element methods for active contour models and balloons for 2D and 3D images" IEEE Transactions on Pattern Analysis; Nov. 1993; pp. 1131-1147; vol. 15, No. 11, IEEE society, USA.

Lorigo, Liana M., et al. "Segmentation of bone in clinical knee MRI using texture-based geodesic active contours." International Conference on Medical Image Computing and Computer-Assisted Intervention. Springer Berlin Heidelberg, 1998.

Cohen, Laurent D. "On active contour models and balloons." CVGIP: Image understanding 53 (1991): 211-218.

Archip, Neculai, et al. "Anatomical structure modeling from medical images." Computer Methods and Programs in Biomedicine 82 (2006): 203-215.

* cited by examiner

CONCURRENT ACTIVE CONTOUR SEGMENTATION

CROSS-REFERENCE TO RELATED APPLICATIONS

This patent application claims priority of U.S. provisional Application Ser. No. 61/809,942, filed on Apr. 9, 2013.

TECHNICAL FIELD

The present invention relates to the field of image segmentation, and more particularly, to active contour segmentation.

BACKGROUND OF THE ART

There exists many different techniques for image segmentation, which refers to the partitioning of a digital image into multiple segments in order to provide an image that is more meaningful or easier to analyze. Objects and boundaries in the image, such as lines, curves, and others, are located and enhanced using shared pixel characteristics, such as color, intensity, or texture. Bones, cartilage, ligaments, and other soft tissues of the body thus become identifiable by the trained eye.

However, segmentation can prove difficult when the image data comprises contiguous structures, such as cartilage. Indeed, the cartilage of a first bone may tend to blend with the cartilage of a second bone contiguous to the first bone without any clear and distinct boundary or transition. As a result, difficulty arises in segmenting cartilage of contiguous structures in an image.

There is therefore a need to improve on existing segmentation techniques.

SUMMARY

There is described herein an image segmentation technique for defining structures, e.g. contiguous structures that have no distinct boundaries. Active contours are concurrently and iteratively deformed into the defined structures. As each contour is deformed, various constraints are applied to points along the contour to dictate its rate of change and direction of change are modified dynamically. The constraints prevent intersection between the contours being deformed. The constraints may be modified at each iteration and at each point along the contour.

In accordance with a first broad aspect, there is described a computer-implemented method for active contour segmentation of imaging data, the method comprising receiving an image of a first structure and at least a second structure; receiving a first initial position on the image for the first structure and at least a second initial position on the image for the at least second structure; setting the first initial position as a first initial contour and the at least second initial position as an at least second initial contour; and concurrently and iteratively deforming the first initial contour and the at least second initial contour to respectively expand into a first expanded contour matching a shape of the first structure and at least a second expanded contour matching a shape of the at least second structure by applying one or more constraints to each point of the first initial contour and the at least second initial contour, a selected one of the one or more constraints being applied for preventing the first initial contour and at least one of the at least second initial contour from intersecting one another upon being deformed, and updating the one or more constraints after each iteration.

In some embodiments, receiving the image comprises receiving the image of the first structure and the at least second structure, the first and at least second structure contiguous.

In some embodiments, deforming the first initial contour and the at least second initial contour by applying the selected constraint comprises, for each point of each one of the first initial contour and the at least second initial contour computing a minimum distance between the point and at least another one of the first initial contour and the at least second initial contour; comparing the minimum distance to a first threshold; if the minimum distance is greater than the first threshold, setting a current position of the point in the image to be equal to a previous position held by the point at a previous iteration and stopping deformation of the one of the first initial contour and the at least second initial contour; and otherwise, pursuing the deformation.

In some embodiments, deforming the first initial contour and the at least second initial contour by applying the one or more constraints comprises computing one or more form constraints to be applied at each point along at least one of the first initial contour and the at least second initial contour in order to modify a displacement strength of the point in accordance with the shape of a corresponding one of the first structure and the at least second structure and with a current position of the point within the corresponding one of the first structure and the at least second structure in the image, and applying the one or more form constraints to the point.

In some embodiments, deforming the first initial contour and the at least second initial contour by applying the one or more constraints comprises computing one or more deformation constraints to be applied at each point along at least one of the first initial contour and the at least second initial contour in order to achieve a desired curvature for the at least one of the first initial contour and the at least second initial contour, and applying the one or more deformation constraints to the point.

In some embodiments, the method further comprises detecting one or more edges in the image and deforming the first initial contour and the at least second initial contour by applying the one or more constraints comprises computing a value of a gradient force at each point along the one of the first initial contour and the at least second initial contour; computing a fourth distance between the one or more edges and each point along the one of the first initial contour and the at least second initial contour; comparing the fourth distance to a fourth threshold; if the fourth distance is greater than the fourth threshold, using a force normal to the one of the first initial contour and the at least second initial contour at each point along the one of the first initial contour and the at least second initial contour to displace the one of the first initial contour and the at least second initial contour; and otherwise, using the gradient force to displace the one of the first initial contour and the at least second initial contour.

In some embodiments, using the normal force to displace the one of the first initial contour and the at least second initial contour comprises determining a displacement direction of each point along the one of the first initial contour and the at least second initial contour; for each point along the one of the first initial contour and the at least second initial contour, identifying ones of the one or more edges present in the displacement direction; discriminating between ones of the one or more edges present in the displacement direction that delineate a boundary of a corresponding one of the first structure and the second structure and ones of the one or more edges present in the displacement direction and representative of noise in the image; and adjusting the normal force in accordance with the fourth distance between each point along the one of the first initial contour and the at least second initial contour and the edges present in the displacement direction such that a displacement strength of the point in the displacement direction causes the one of the first initial contour and the at least second initial contour to be displaced beyond the edges present in the displacement direction and representative of noise.

In some embodiments, discriminating comprises discriminating between the one or more edges on the basis of at least one of a length of each of the one or more edges, a ratio of the length of each of the one or more edges to a size of an image area containing the edge, a curvature of each of the one or more edges, and an intensity of pixels forming each of the one or more edges.

In some embodiments, the method further comprises computing a spacing between the one or more edges present in the displacement direction, comparing the spacing to a tolerance, and, if the spacing is below the tolerance, adjusting the normal force such that the displacement strength of the point in the displacement direction prevents the current contour from entering the spacing between the one or more edges.

In some embodiments, the method further comprises, after each iteration and for each point on the first initial contour and on the at least second initial contour, identifying a closest neighboring point, computing a second distance between the point and the closest neighboring point, comparing the second distance to a second threshold, and, if the second distance is above the second threshold, inserting one or more points between the point and the closest neighboring point for bringing the second distance below the second threshold.

In some embodiments, deforming the first initial contour and the at least second initial contour by applying the one or more constraints comprises computing a third distance between two consecutive deformations of each one of the first initial contour and the at least second initial contour; determining a rate of change of the third distance over a predetermined number of iterations; comparing the rate of change to a third threshold; if the rate of change is above the third threshold, further deforming the one of the first initial contour and the at least second initial contour to bring the third distance below the third threshold; and otherwise, stopping deformation of the one of the first initial contour and the at least second initial contour at a current iteration.

In some embodiments, if the rate of change is above the third threshold, further deforming comprises deforming the one of the first initial contour and the at least second initial contour for at most a predetermined number of supplementary iterations.

In some embodiments, receiving the first initial position and the second initial position comprises one of receiving a user-defined selection of the first and the at least second initial positions and randomly determining a first point in the image inside a boundary of the first structure and a second point in the image inside a boundary of the second structure.

In accordance with a second broad aspect, there is described a system for active contour segmentation of imaging data, the system comprising a memory; a processor; and at least one application stored in the memory and executable by the processor for receiving an image of a first structure and at least a second structure, receiving a first initial position on the image for the first structure and at least a second initial position on the image for the at least second structure, setting the first initial position as a first initial contour and the at least second initial position as an at least second initial contour, and concurrently and iteratively deforming the first initial contour and the at least second initial contour to respectively expand into a first expanded contour matching a shape of the first structure and at least a second expanded contour matching a shape of the at least second structure by applying one or more constraints to each point of the first initial contour and the at least second initial contour, a selected one of the one or more constraints being applied for preventing the first initial contour and at least one of the at least second initial contour from intersecting one another upon being deformed, and updating the one or more constraints after each iteration.

In some embodiments, the at least one application is executable by the processor for receiving the image comprising receiving the image of the first structure and the at least second structure, the first and at least second structure contiguous.

In some embodiments, the at least one application is executable by the processor for deforming the first initial contour and the at least second initial contour by applying the selected constraint comprising, for each point of each one of the first initial contour and the at least second initial contour computing a minimum distance between the point and at least another one of the first initial contour and the at least second initial contour; comparing the minimum distance to a first threshold; if the minimum distance is greater than the first threshold, setting a current position of the point in the image to be equal to a previous position held by the point at a previous iteration and stopping deformation of the one of the first initial contour and the at least second initial contour; and otherwise, pursuing the deformation.

In some embodiments, the at least one application is executable by the processor for deforming the first initial contour and the at least second initial contour by applying the one or more constraints comprising computing one or more form constraints to be applied at each point along at least one of the first initial contour and the at least second initial contour in order to modify a displacement strength of the point in accordance with the shape of a corresponding one of the first structure and the at least second structure and with a current position of the point within the corresponding one of the first structure and the at least second structure in the image, and applying the one or more form constraints to the point.

In some embodiments, the at least one application is executable by the processor for deforming the first initial contour and the at least second initial contour by applying the one or more constraints comprising computing one or more deformation constraints to be applied at each point along at least one of the first initial contour and the at least second initial contour in order to achieve a desired curvature for the at least one of the first initial contour and the at least second initial contour, and applying the one or more deformation constraints to the point.

In some embodiments, the at least one application is executable by the processor for detecting one or more edges in the image and for deforming the first initial contour and the at least second initial contour by applying the one or more constraints comprising computing a value of a gradient force at each point along the one of the first initial contour and the at least second initial contour; computing a fourth distance between the one or more edges and each point along the one of the first initial contour and the at least second initial contour; comparing the fourth distance to a fourth threshold; if the fourth distance is greater than the fourth threshold, using a force normal to the one of the first initial contour and the at least second initial contour at each point along the one of the first initial contour and the at least second initial contour to displace the one of the first initial contour and the at least second initial contour; and otherwise, using the gradient force to displace the one of the first initial contour and the at least second initial contour.

In some embodiments, the at least one application is executable by the processor for using the normal force to displace the one of the first initial contour and the at least second initial contour comprising determining a displacement direction of each point along the one of the first initial contour and the at least second initial contour; for each point along the one of the first initial contour and the at least second initial contour, identifying ones of the one or more edges present in the displacement direction; discriminating between ones of the one or more edges present in the displacement direction that delineate a boundary of a corresponding one of the first structure and the second structure and ones of the one or more edges present in the displacement direction and representative of noise in the image; and adjusting the normal force in accordance with the fourth distance between each point along the one of the first initial contour and the at least second initial contour and the edges present in the displacement direction such that a displacement strength of the point in the displacement direction causes the one of the first initial contour and the at least second initial contour to be displaced beyond the edges present in the displacement direction and representative of noise.

In some embodiments, the at least one application is executable by the processor for computing a spacing between the one or more edges present in the displacement direction, comparing the spacing to a tolerance, and, if the spacing is below the tolerance, adjusting the normal force such that the displacement strength of the point in the displacement direction prevents the current contour from entering the spacing between the one or more edges.

In some embodiments, the at least one application is executable by the processor for, after each iteration and for each point on the first initial contour and on the at least second initial contour, identifying a closest neighboring point, computing a second distance between the point and the closest neighboring point, comparing the second distance to a second threshold, and, if the second distance is above the second threshold, inserting one or more points between the point and the closest neighboring point for bringing the second distance below the second threshold.

In some embodiments, the at least one application is executable by the processor for deforming the first initial contour and the at least second initial contour by applying the one or more constraints comprising computing a third distance between two consecutive deformations of each one of the first initial contour and the at least second initial contour; determining a rate of change of the third distance over a predetermined number of iterations; comparing the rate of change to a third threshold; if the rate of change is above the third threshold, further deforming the one of the first initial contour and the at least second initial contour to bring the third distance below the third threshold; and otherwise, stopping deformation of the one of the first initial contour and the at least second initial contour at a current iteration.

In some embodiments, the at least one application is executable by the processor for, if the rate of change is above the third threshold, further deforming comprising deforming the one of the first initial contour and the at least second initial contour for at most a predetermined number of supplementary iterations.

In some embodiments, the at least one application is executable by the processor for receiving the first initial position and the second initial position comprising one of receiving a user-defined selection of the first and the at least second initial positions and randomly determining a first point in the image inside a boundary of the first structure and a second point in the image inside a boundary of the second structure.

In accordance with a third broad aspect, there is described a computer readable medium having stored thereon program code executable by a processor for active contour segmentation of imaging data, the program code executable for receiving an image of a first structure and at least a second structure; receiving a first initial position on the image for the first structure and at least a second initial position on the image for the at least second structure; setting the first initial position as a first initial contour and the at least second initial position as an at least second initial contour; and concurrently and iteratively deforming the first initial contour and the at least second initial contour to respectively expand into a first expanded contour matching a shape of the first structure and at least a second expanded contour matching a shape of the at least second structure by applying one or more constraints to each point of the first initial contour and the at least second initial contour, a selected one of the one or more constraints being applied for preventing the first initial contour and at least one of the at least second initial contour from intersecting one another upon being deformed, and updating the one or more constraints after each iteration.

BRIEF DESCRIPTION OF THE DRAWINGS

Further features and advantages of the present invention will become apparent from the following detailed description, taken in combination with the appended drawings, in which:

FIG. 7b is a screenshot of an edge image corresponding to the image of FIG. 7a;

FIG. 11b is a block diagram showing an exemplary concurrent active contour segmentation module of FIG. 11a;

It will be noted that throughout the appended drawings, like features are identified by like reference numerals.

DETAILED DESCRIPTION

Figure 1:
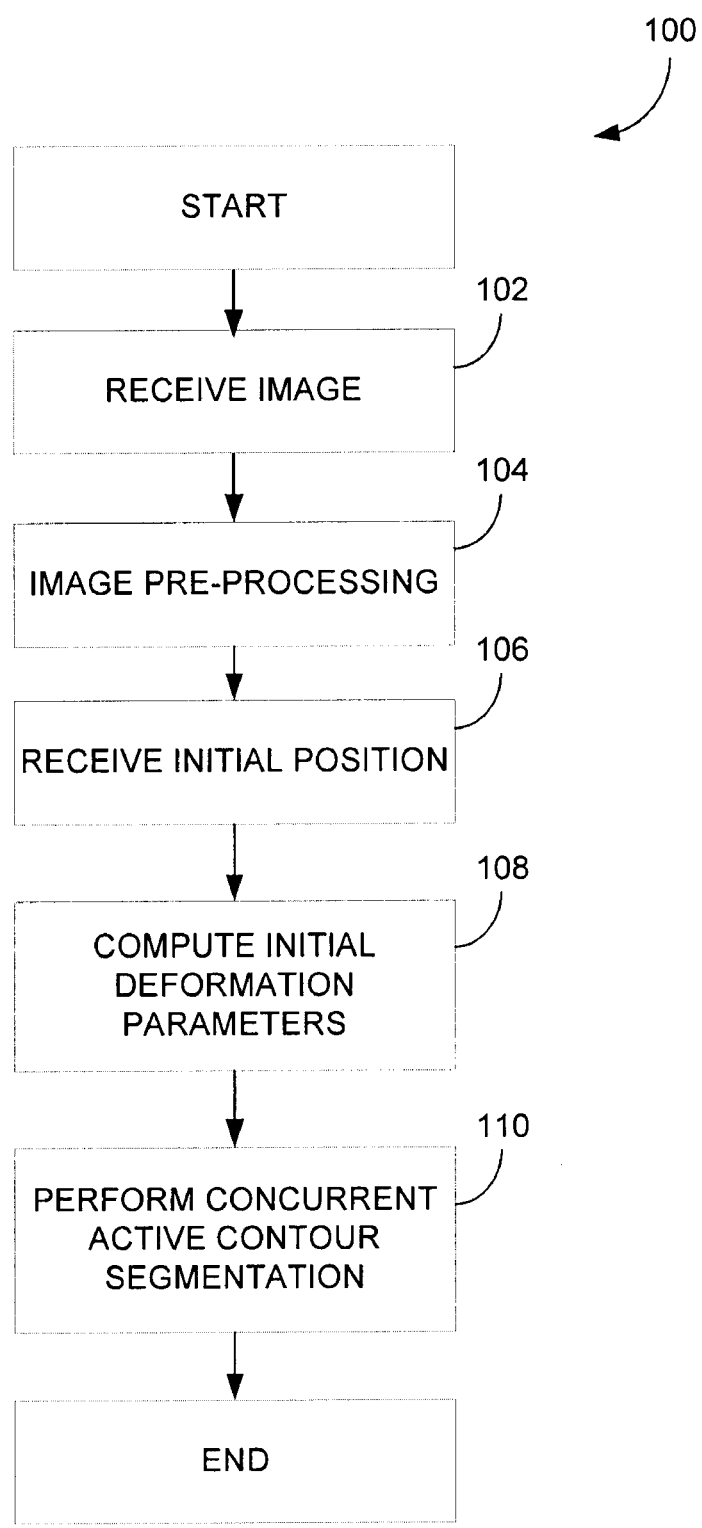
FIG. 1 is a flowchart illustrating an exemplary method for performing concurrent active contour segmentation, in accordance with an illustrative embodiment of the present invention.

Referring to FIG. 1, a method 100 for performing concurrent active contour segmentation will now be described. The method 100 may be used to segment images in order to identify anatomical structures therein. The method 100 is suitable for identifying contiguous structures, such as cartilage, that may blend together in the image without a clear and distinct boundary and may therefore be difficult to distinguish. It should be understood that the method 100 may also apply to structures, which are not contiguous. The method 100 illustratively comprises the broad steps of receiving at step 102 an image, pre-processing at step 104 the received image, receiving at step 106 an initial position from which the concurrent active contour segmentation will be started, computing at step 108 initial deformation parameters, and performing at step 110 the concurrent active contour segmentation to identify the different structures in each image slice.

The image data received at step 102 is representative of an anatomical region under study, such as an articulation, e.g. the knee region. For each image data, the number of initial positions received at step 106 determines the number of structures to process in the image. When more than one structure is to be processed, the steps 104 to 110 may be repeated for all structures in the image data. For example, when image data of a knee region is received, the image data may comprise initial contour data of a first structure corresponding to a femur and of a second structure corresponding to a tibia. A contour may be deformed for each structure using step 110, with both contours evolving concurrently. Once all images and all structures of interest have been processed, segmentation is complete. In one embodiment, the images are processed sequentially, i.e. one at a time. In alternative embodiments, the images may be processed in parallel. Parallel processing may reduce the overall time required to generate segmented data. It also prevents errors from being propagated throughout the set of image slices, should there be errors introduced in each image during any of the steps 104 to 110.

The image(s) may be obtained from scans generated using Magnetic Resonance Imaging (MRI), Computed Tomography (CT), ultrasound, x-ray technology, optical coherence tomography, or the like. The image(s) may be captured along one or more planes throughout a body part, such as sagittal, coronal, and transverse. In some embodiments, multiple orientations are performed and the data may be combined or merged during the pre-processing step 104. For example, a base set of images may be prepared on the basis of data acquired along a sagittal plane, with missing information being provided using data acquired along a coronal plane. Other combinations or techniques to optimize the use of data along more than one orientation will be readily understood by those skilled in the art. In some embodiments, a volume of data is obtained using a 3D acquisition sequence independent of an axis of acquisition. The volume of data may be sliced in any direction as desired. The image data may be provided in various known formats and using various known protocols, such as Digital Imaging and Communications in Medicine (DICOM), for handling, storing, printing, and transmitting information. Other exemplary formats are GE SIGNA Horizon LX, Siemens Magnatom Vision, SMIS MRD/SUR, and GE MR SIGNA 3/5 formats.

Figure 2A:
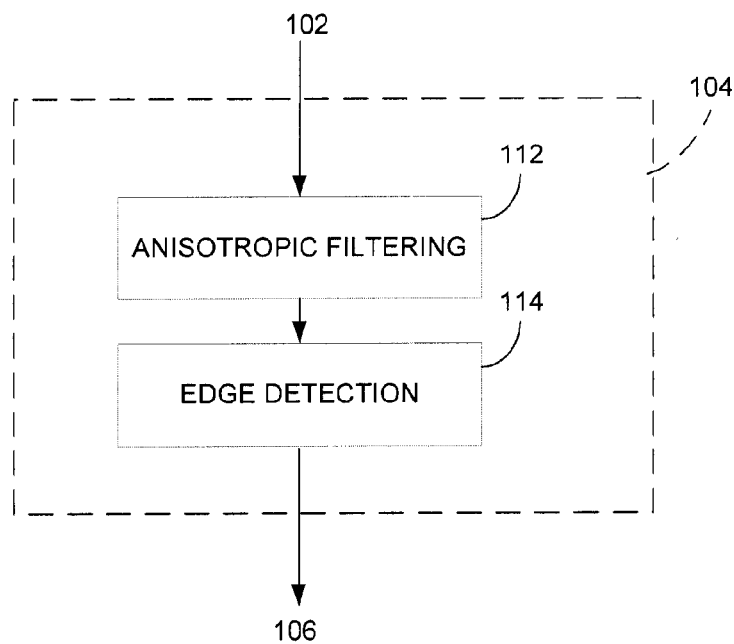
FIG. 2a is a flowchart of the step of FIG. 1 of pre-processing a received image.

FIG. 2a is an exemplary embodiment of the image pre-processing step 104. Image pre-processing 104 may comprise performing at step 112 anisotropic filtering on the images received at step 102. Such anisotropic filtering 112 may be used to decrease the noise level in the received image. Edge detection may also be performed at step 114. The edges may correspond to sudden transitions in the image gradient and may represent boundaries of objects or material properties. Edge detection 114 may be performed using the Canny method, Sobel filters, or other suitable techniques known to those skilled in the art. Subsequent to edge detection 114, an edge image is obtained, in which information that may be considered of low relevance has been filtered out while preserving the important structural properties of the original image. In particular, the edge image may comprise a set of connected curves that indicate the boundaries of image structures as well as curves that correspond to discontinuities in surface orientation. The concurrent active contour segmentation step 110 is illustratively performed on the basis of knowledge of the edges, as identified in the edge image further to the pre-processing step 104.

Figure 2B:
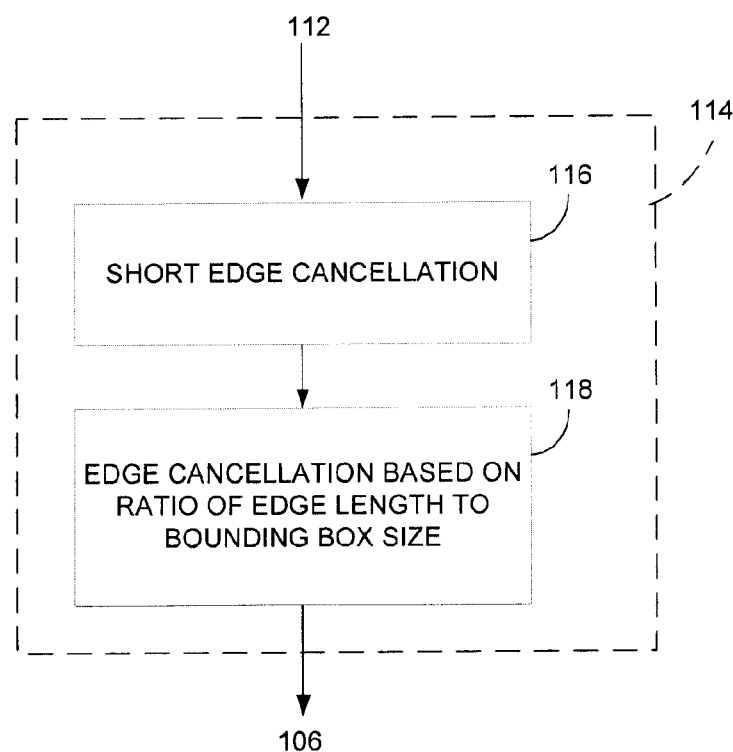
FIG. 2b is a flowchart of the step of FIG. 2a of edge detection.

In particular, edge detection may be performed at step 114 knowing that it is desirable for the image to comprise long edges, which are continuous and uniform in their curvature. Such edges are edges of interest, which delineate the structure to be segmented. Any other edges may then be identified as noise. As shown in FIG. 2b, edge detection 114 may therefore comprise the step 116 of detecting short edges (e.g. edges whose length is below a predetermined threshold length), which are identified as noise and cancelled from the image data received at step 102. Edge detection 114 may further comprise cancellation at step 118 of edges according to the ratio between the length, i.e. the number of pixels, of each edge and the size of the bounding box, i.e. the image area, containing the edge. This ratio enables, upon comparison to a predetermined threshold ratio, to detect edges having a length much greater than the size of their bounding box, i.e. edges that are folded over themselves. Such folded edges may then be identified as noise in the image and cancelled accordingly at step 118. Although step 118 is illustrated as comprising performing both steps 116 and 118, it should be understood that at least one of steps 116 and 118 may be performed for edge detection 114. Also, step 118 may comprise performing edge detection and discriminating between noisy edges and edges of interest on the basis of the difference of intensity of the edges and/or neighboring points, the mean intensity value of pixies forming the edges, the curvature of the edges, or whether the edges are closed. Other criteria may apply.

Referring back to FIG. 1, the step 106 of receiving an initial position may comprise receiving an initial position or starting point for contour deformation of the structure(s) to be segmented in the image received at step 102. For example, an initial position representative of the boundary of a bone, e.g. the femur, surrounding cartilage to be segmented may be received at step 106. The bone boundary may then be used as the initial contour from which concurrent active contour deformation of the cartilage is started. In some embodiments, the initial position may be a single point or four (4) neighboring points (or pixels) around a single point. The initial position received at step 106 may be computed using an initialization algorithm that automatically determines a point inside a surface or boundary of the structure to be segmented. The initial position may alternatively be determined, e.g. marked, manually by an operator on each slice that defines a volume of the structure. Still, it is desirable for the initialization to be performed independently from other parameters. As such, any point within the structure may therefore be randomly selected for use as the initial position. Once the initial position has been received at step 106, it may be used as an initial contour that will be deformed to segment the structure of interest for each image slice.

Figure 3:
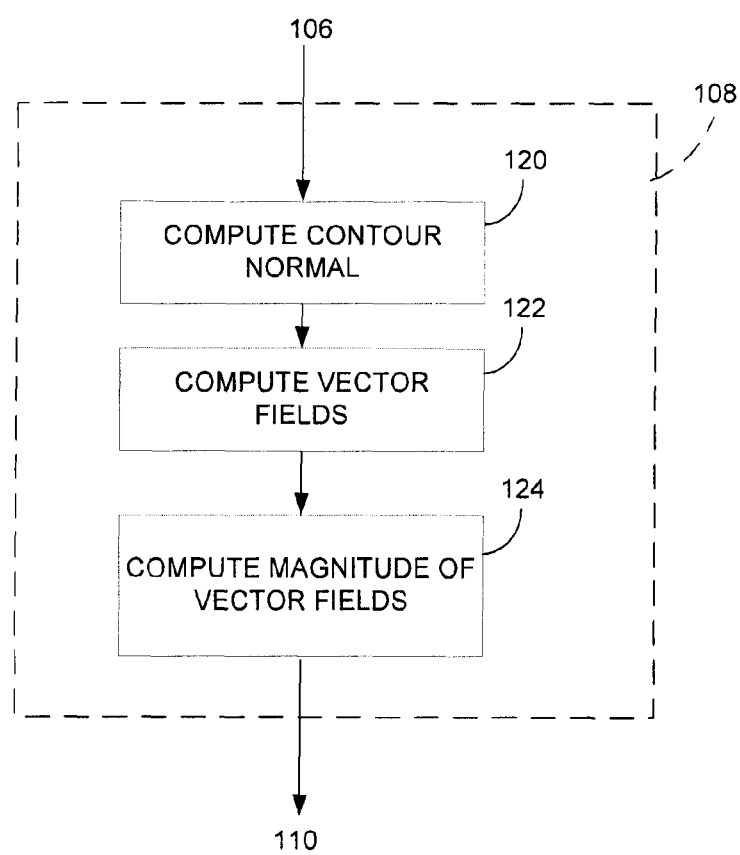
FIG. 3 is a flowchart of the step of FIG. 1 of computing initial deformation parameters.

Referring to FIG. 3, the step 108 of computing initial deformation parameters may be performed once for the image received at step 102. The step 108 illustratively comprises computing the contour normal at step 120 using techniques known to those skilled in the art. Vector fields (e.g. gradient vector fields) may then be computed at step 122 and their magnitude may be computed at step 124. The vector fields are illustratively computed on the image preprocessed at step 104, i.e. on the edge image using various known methods, such as the Gradient Vector Flow (GVF) method. The vector field magnitude computed at step 124 indicates the strength of the image gradient.

Figure 4A:
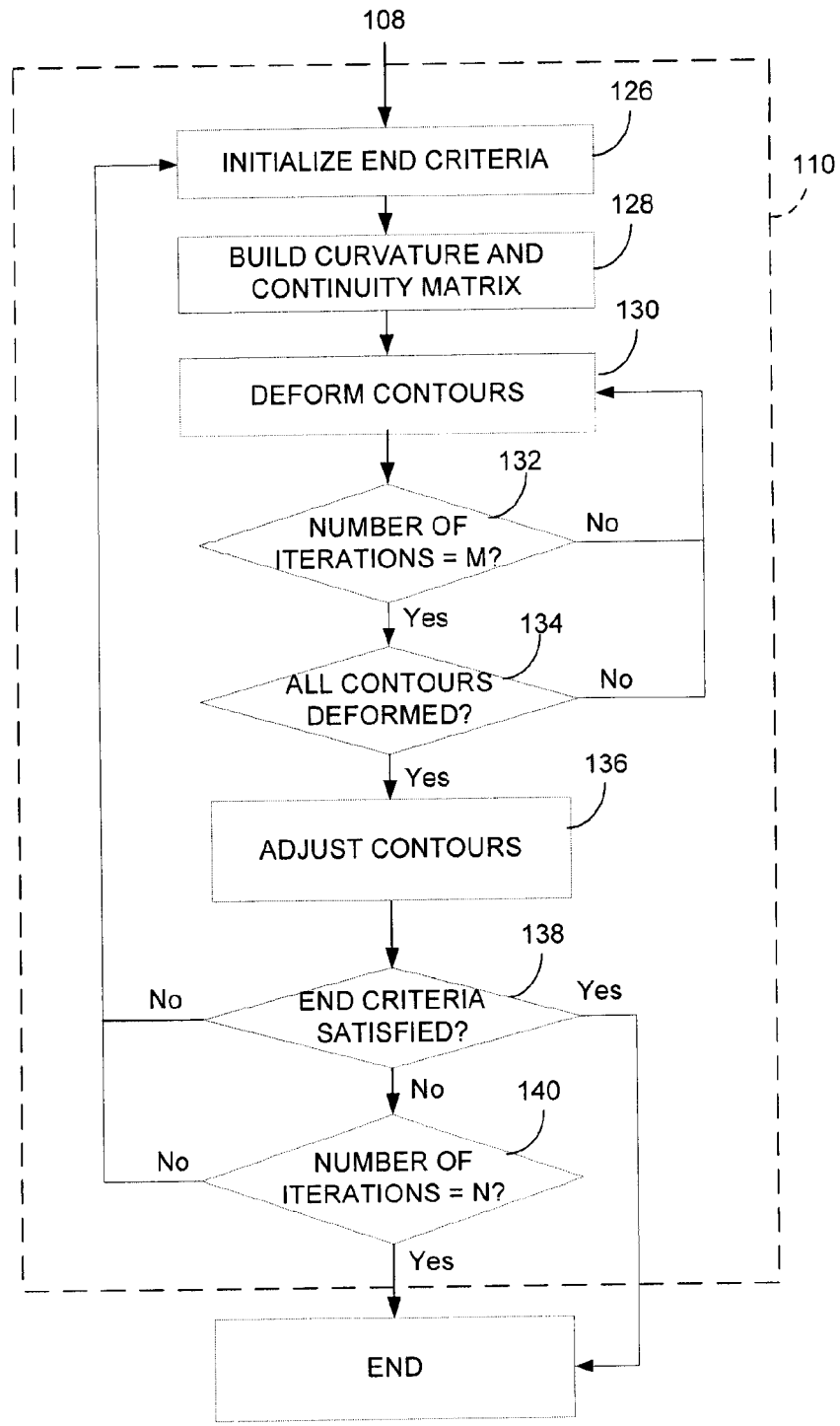
FIG. 4a is a flowchart of the step of FIG. 1 of performing concurrent active contour segmentation.

Referring now to FIG. 4a, the step 110 of performing concurrent active contour segmentation illustratively comprises initializing an end criteria at step 126. The end criteria is illustratively based on the rate of change of the distance between two (2) successive contours for a predetermined number of successive iterations of the contour deformation. This distance is indicative of the expansion of the contour from one deformation to the next. For example, the rate of change of the distance between successive contours obtained after five (5) iterations may be evaluated. The rate of change may then be compared to a predetermined tolerance or threshold in order to evaluate the end criteria. The end criteria may therefore be initialized as being equal to the threshold on the rate of change of the contour distance. In one embodiment, the end criteria is initialized to range from 0.005 to 0.0005 pixels. It should be understood that the end criteria may be initialized to various ranges or values according to application requirements. Thus, evaluation of the end criteria, as will be discussed further below, entails assessing whether the rate of change of the contour distance is within the tolerance, e.g. between 0.005 and 0.0005. If this is the case, the end criteria is satisfied and the method 100 may end. By evaluating the end criteria, oscillatory behavior between successive iterations can therefore be prevented.

After the end criteria has been initialized at step 126, the next step 128 may then be to build a curvature and continuity matrix. Such a matrix illustratively manages continuity and curvature constraints to ensure adequate continuity and curvature at each point along the contour. In particular, it may not be desirable for the contour's curvature to be overly strong or stiff. The desired curvature to be achieved in the contour may then be specified in the curvature and continuity matrix. In particular, the matrix may be used to define deformation constraints to be applied at each point along the contour for a given iteration of contour deformation in order to obtain the desired contour curvature. In addition, since it may be desirable for the contour points to be positioned within some contour holes while avoiding others, the matrix may further be used to specify the size of holes between edges the contour may be allowed or prevented from fitting into. Since the number of points on the contour, and accordingly the curvature, gradient, and contour constraints, vary dynamically with each contour deformation iteration, a new matrix is illustratively computed each time the deformation process begins.

The next step 130 may be to simultaneously deform the contours using concurrent active contour deformation, as will be discussed further below. In the embodiment illustrated, deformation is performed using a set of dynamically set constraints at each point along the contour. The contours are illustratively deformed for a predetermined number M of iterations. The step 110 therefore comprises assessing at step 132 whether the number M of iterations has been reached. If this is not the case, the method 100 may flow back to the step 130 of deforming the contours. Otherwise, the next step 134 may be to assess whether all contours within the image of the structure(s) to be segmented have been deformed. If this is not the case, the method 100 may flow back to step 130.

If the predetermined number of M iterations has been reached and all contours have been deformed concurrently, the contours may be adjusted at step 136, as will be discussed further below. The next step 138 may then be to determine whether the end criteria initialized at step 126 has been satisfied. As discussed above, this illustratively comprises computing the distance between two (2) consecutive contours obtained after two (2) successive iterations of the deformation 130. The distances may then be summed for all contour points and normalized by the number of contour points. The result may then be compared to the end criteria, i.e. the tolerance on the rate of change of the contour's distance, initialized at step 126. If the rate of change of the computed distance is beyond the threshold, the end criteria is not satisfied and further deformation of the contours is required to arrive at a distance that is within (i.e. below or equal to) the threshold. The method 100 may then return to step 126. Otherwise, if the rate of change of computed distance is below (or equal to) the threshold, it can be determined that the current contour has expanded sufficiently and closely match the structures that were to be segmented. The deformation of the contour can therefore be stopped and the method 100 may end.

An optional step 140 may be included as a means to further prevent oscillatory behaviours. If it is determined at step 138 that the end criteria is not satisfied, the step 110 may indefinitely loop to achieve a rate of change of the contour's distance that is within the threshold discussed above. In order to avoid this situation, the number of iterations of the outer loop of step 110 may be limited to a predetermined value N. For this purpose, the step 140 may comprise determining whether N iterations of the outer loop of step 110 have been performed. In this manner, even if it has been determined at step 138 that the end criteria is not satisfied but the predetermined number N of iterations has been performed, the step 110 may end, thereby preventing infinite loops. Otherwise, if the predetermined number N of iterations has not been reached, the method 100 may return to the step 126 of initializing the end criteria.

Figure 4B:
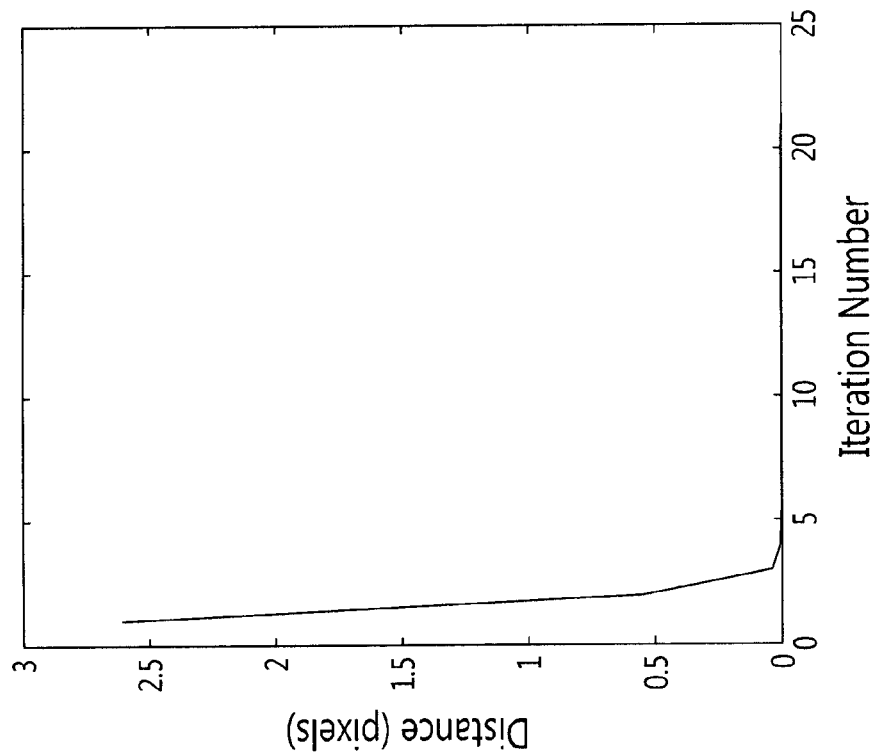
FIG. 4b illustrates an edge image showing an expanding contour and a graph showing the distance between successive deformations of an expanding contour, in accordance with an illustrative embodiment of the present invention.
Figure 4B:
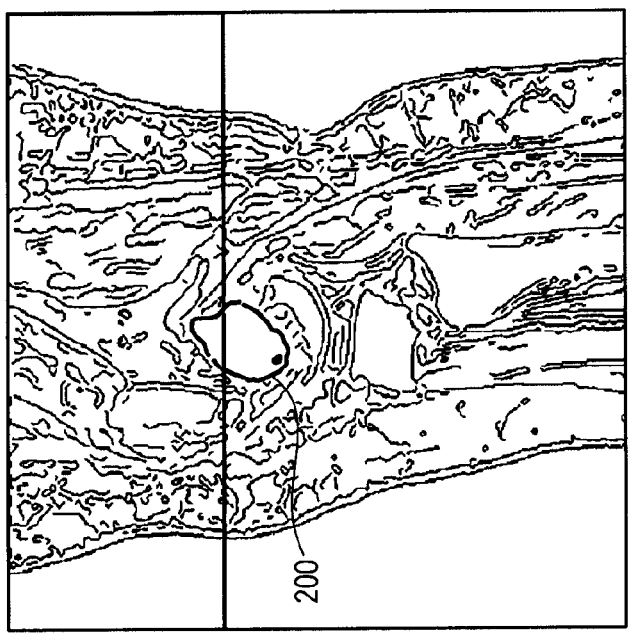

FIG. 4b shows the distance between two (2) consecutive contours as a function of the number of deformation iterations of an expanding contour 200. As discussed above, this distance is indicative of the expansion of the contour 200 from one deformation to the next. For instance, the greater the distance at a current iteration, the more the contour 200 has expanded between the preceding iteration and the current iteration. If the distance is small, this infers that the contour 200 has only expanded slightly. It can be seen that in the first iterations, e.g. the first three (3) iterations, of the deformation step 130, the distance between successive deformations of the contour 200 decreases rapidly from about 2.6 pixels to about 0.1 pixel as the number of iterations increases. The distance then reaches a quasi asymptotical level as the number of iterations is increased further. In particular, between iterations five (5) and twenty-one (21), there is very little change in the value of the distance, which is close to zero. This indicates that the contour has reached (or is close to reaching) an optimal state and that deformation is (or is close to being) complete. Confirmation that the end of the deformation process has been reached can be obtained by evaluating the end condition at step 138 discussed above and more particularly by assessing whether the rate of change of the distance is within the predetermined tolerance.

Figure 5A:
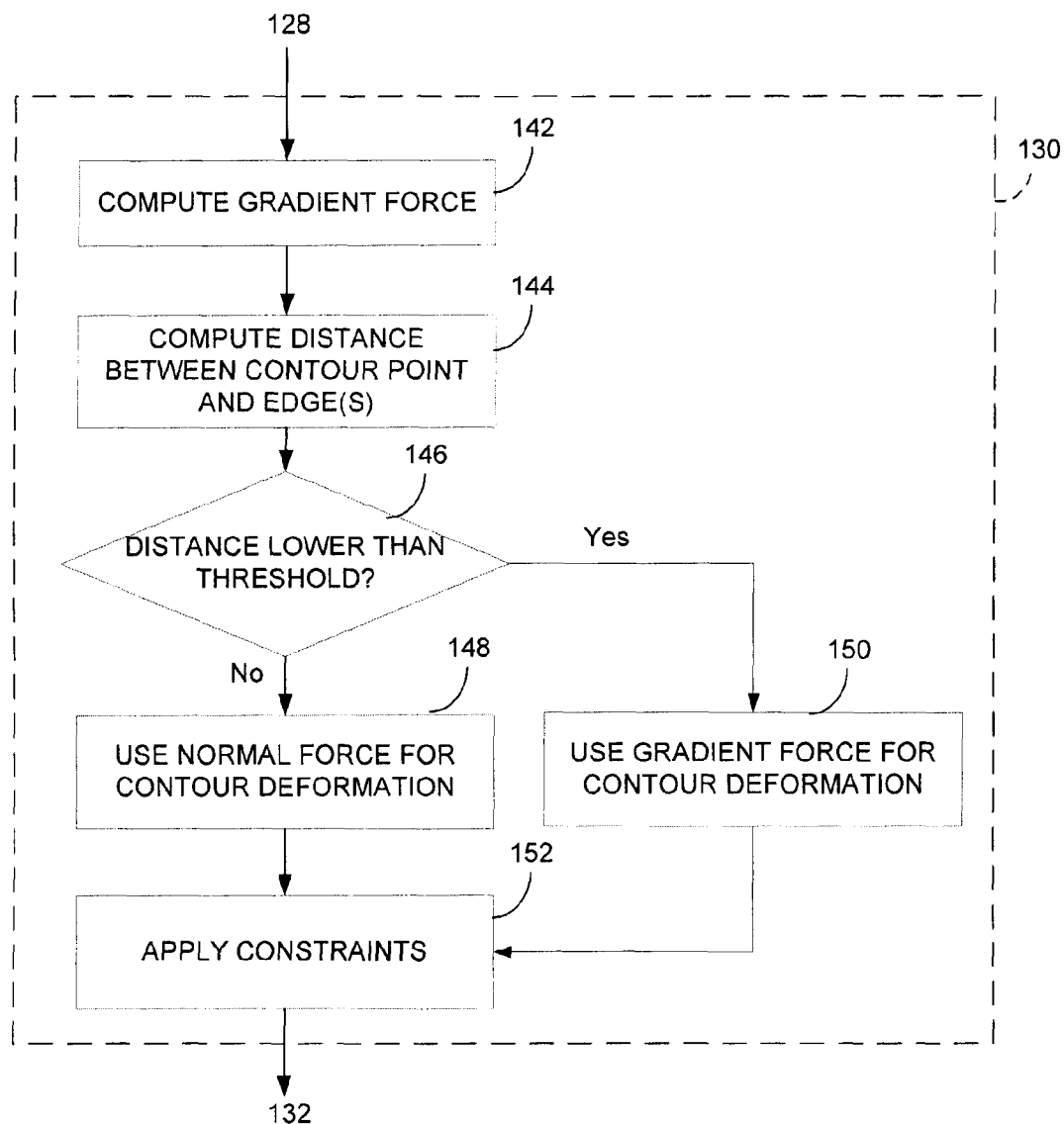
FIG. 5a is a flowchart of the step of FIG. 4a of deforming contours.

Referring to FIG. 5a, the step 130 of deforming the contours illustratively comprises computing at step 142 the gradient force. This entails computing the value of the gradient for each point on the contour using techniques known to those skilled in the art. The distance between each contour point and one or more edges in the edge image may then be computed at step 144. This distance may be used to determine whether the contour is close to or far from the edges. For this purpose, the distance may be compared to a predetermined threshold distance to assess at step 146 whether the distance is lower than the threshold. If the distance is greater than the threshold, this means that the contour is far away from the edge, i.e. in an image area with low gradient values. The normal force, which represents the force that is normal to the contour at each contour point, may then be used at step 148 to deform the contour. Since the expanding contour is positioned further away from the edges in the early iterations of step 110, the normal force is illustratively used to displace the contour the most in early stages of the deformation. If the distance computed at step 144 is lower than the threshold, the contour is close to the edge, i.e. an image area with high gradient values, and the gradient force may be used at step 150 to deform the contour. Constraints may further be applied at step 152 to ensure the contour is deformed as desired.

Figure 5B:
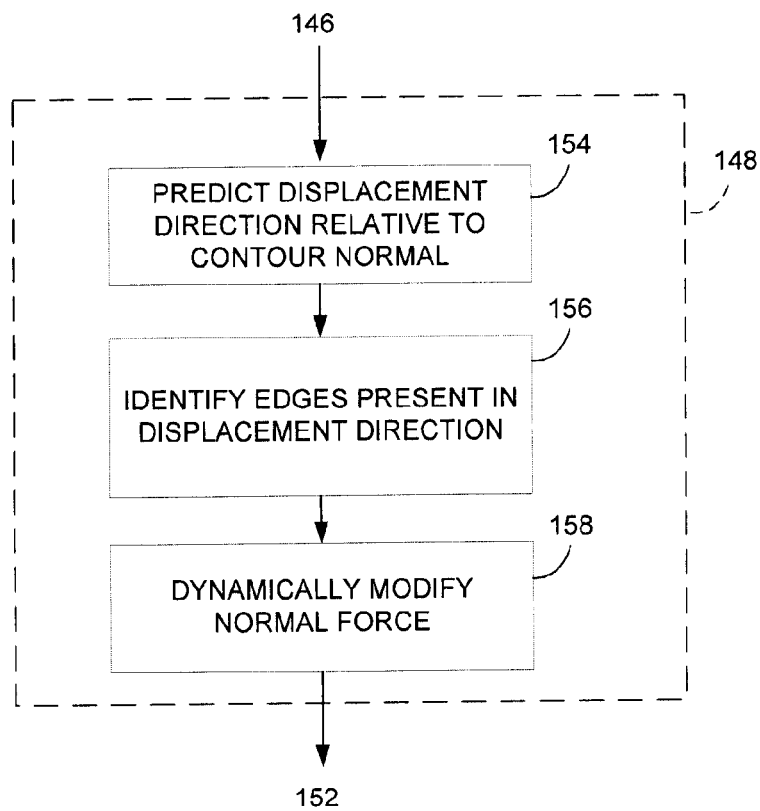
FIG. 5b is a flowchart of the step of FIG. 5a of using the normal force for contour deformation.
Figure 5C:
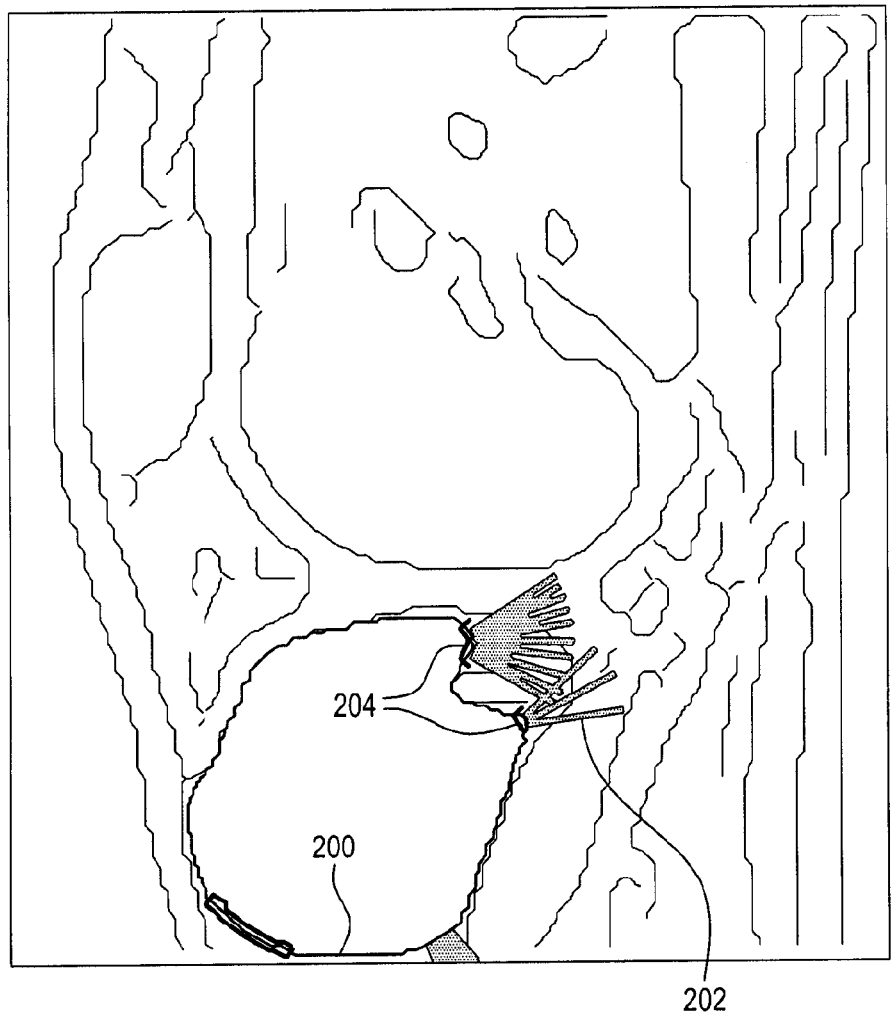
FIG. 5c is a screenshot illustrating radiuses extending away from contour normals in a displacement direction, in accordance with an illustrative embodiment of the present invention.

Referring to FIG. 5b, the step 148 of using the normal force for contour deformation illustratively comprises determining at step 154 the displacement direction of contour points relative to the contour normal. The displacement direction of each contour point is illustratively perpendicular to the contour normal at a given contour point. This is shown in FIG. 5c, where radiuses as in 202 each represent the displacement direction at a given contour point. Each radius 202 extends away from a normal 204 to the contour 200 in a direction substantially perpendicular to the normal. The next step 156 may then be to identify, which edges are present in the displacement direction associated with a current contour point and discrimination between edges of interest, i.e. real edges that delineate the boundary of a structure, and noise using a priori knowledge. A displacement direction may be associated with a contour point if it is in range of gradient influence of this point. The a priori knowledge may be gained from the displacement of contour points adjacent to the given contour point. During deformation of the contour, all contour points illustratively evolve towards the edges in the edge image and stop once they reach an edge. The edge at which each contour point stops may either be an edge of interest, e.g. a long edge, or noise, e.g. a short and/or folded edge, as discussed above. When an edge is of interest, i.e. long, most contour points will tend to evolve towards this edge at each deformation iteration and eventually stop thereat. However, when an edge is noise, i.e. short, fewer contours points tend to evolve towards the edge and stop thereat. Using this a priori knowledge, it becomes possible to discriminate between edges and step 156 can thus be used to forecast whether important edges are in the displacement direction. The evolving contour may then be prevented from stopping at false short edges, i.e. noise, thereby accurately expanding the contour within the structure to be segmented. As can be seen in FIG. 5c, the evolving contour may be expanded to bypass noisy edges and to be precisely positioned within narrow cavities (not shown) of the structure. For this purpose, the normal force may be adjusted such that the magnitude of the displacement of the contour points is sufficient to cause the contour to be displaced beyond the noisy edges.

Once the displacement direction has been determined at step 154 and edges in the displacement direction identified at step 156, the normal force may be dynamically modified at step 158. In particular, the normal force may be modified according to the distance between a point on the current contour and edges in the edge image, as computed at step 144. The normal force is indeed adjusted so that the magnitude of the displacement of the contour point is not so high that the contour, once deformed from one iteration to the next, is displaced beyond a given edge, e.g. an edge of interest. For this purpose, the normal force may, for example, be dynamically modified so as not to apply to all contour points and/or have a maximum magnitude for all deformation iterations.

The normal force may also be adjusted to avoid having the expanding contour enter into holes between edges. This may be done by setting a threshold parameter for a distance between two edges. If the distance between the edges is smaller than the threshold parameter, the contour is not allowed to enter the space between the edges during its deformation at that point. During the deformation process, the magnitude of the vector field at each point along a contour is evaluated at step 124 of FIG. 3. For zones where the magnitude is lower than a given parameter, spacing or distance between edges is measured and the normal force applied at those points may be reduced in order to avoid having the contour enter a small hole between the edges. Alternatively, holes may be detected according to the distance between each contour point and the edges, as computed at step 144 of FIG. 5a. In particular, holes may be detected by identifying adjacent points on the current contour, which are close to edges. For instance, for a contour comprising fifty (50) points numbered from 1 to 50, contour points 10 to 20 may be identified as being close to a first edge and points 24 to 30 as being close to a second edge while contour points 21 to 23 are close to neither the first nor the second edge. As such, it can be determined that points 21 to 23 are positioned nearby a hole between the first edge and the second edge. Having detected this hole, the current contour can be prevented from entering therein by adjusting at step 158 the normal force applied to contour points 21 to 23 accordingly. A threshold may also be associated with the size of the detected holes. In particular, gaps between edges that are lower than a predetermined threshold may be considered as holes while gaps that are above the threshold may not. For instance, the threshold may be set to a size of ten (10) points. The gap between points 21 to 23 having a size of three (3) points, which is lower than ten (10), the gap can be identified as a hole.

Figure 5D:
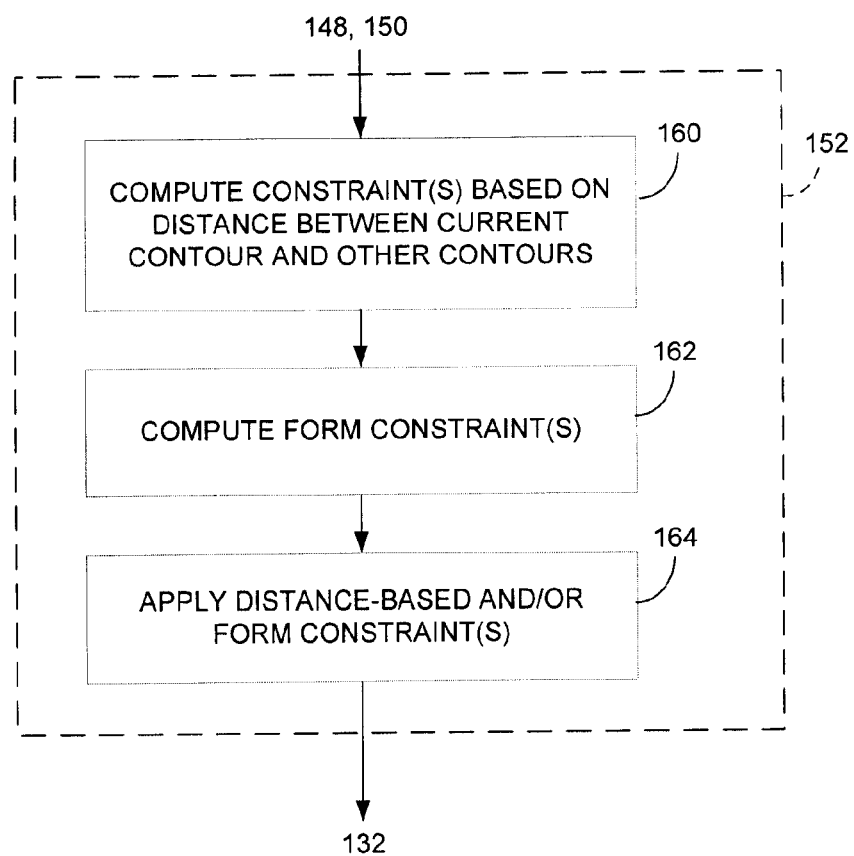
FIG. 5d is a flowchart of the step of FIG. 5a of applying constraints.

Referring to FIG. 5d, the step 152 of applying constraints illustratively comprises computing at step 160 one or more constraints based on the distance between the current contour and other contours present in the image. In one embodiment, the constraint(s) may be modified after each iteration and at each point along the contour independently from the constraint(s) of a neighboring point (or any other point along the contour) based on a newly computed distance. As discussed above, the image data received at step 102 of FIG. 1 may comprise image data of a first structure, e.g. a femur, a second structure, e.g. a tibia, and a third structure, e.g. a patella. A contour may accordingly be defined for each structure with the two (2) contours evolving simultaneously according to the steps of the method 100. The distance-based constraint(s) may then be used to specify that concurrently evolving contours may touch but not intersect one another. The displacement of the contours may then be modulated accordingly. For this purpose, the minimum distance between each point of the current contour, e.g. the contour used to define the femur's cartilage, and all other contours present in the image, e.g. the contours used to define the cartilage of the tibia and patella, is computed. This distance is then used as a constraint for the current contour.

Indeed, the computed distance is compared to a predetermined threshold. If a point on the current contour has a distance to all other contours, which is greater than the threshold, the displacement of the contour point is stopped. Indeed, this would mean that deformation of the contour at the current iteration would result in the contour point being positioned in a forbidden zone, i.e. a zone where the current contour intersects or overlaps the remaining contours. The position of the contour point at the current iteration is then set to the contour point's position at the previous iteration. In this manner, the contour point does not move between the previous and the current iteration and is thus prevented from being displaced to the forbidden zone. Although described as preventing intersection of all contours, it should be understood that the distance-based constraint may be used to ensure that a predetermined number of contours, e.g. two (2), out of the total number of contours, e.g. three (3), do not intersect.

One or more form constraints may further be computed at step 162. Each form constraint may be used to impose certain constraints to pixels locally as a function of expected shapes being defined and of the position of a given pixel within the expected shape. For example, if the structure being defined is the cartilage of a femur bone, a point along a contour defining the cartilage of the bottom end of the femur may then be treated differently than a point along a contour defining the cartilage of the top end of the femur. Since the top end of the femur is much larger than the bottom end of the femur, the restrictions applied to the point on the bottom end contour differ from the restrictions applied to the point on the top end contour. For example, if the structure to be segmented has the form of a vertical cylinder, as is the case of the cartilage at the top end of the femur, the form constraint may be used to reduce the displacement of the contour in the horizontal, i.e. X, direction and to force the contour to move in the vertical, i.e. Y, direction only. The form constraint may further specify that no more than 50% of the displacement of contour points is to be performed in the X direction than in the Y direction. The form constraint may therefore modify the displacement vector of the contour so as to increase or decrease the contour's displacement strength in a given direction. In order to apply form constraints, various form constraint zones may be defined and contour points present in the form constraint zones identified. This allows the form constraints to be applied as a function of the position of the pixel and the form constraint zone in which it sits. Application of the form constraints may comprise applying variable forces on X and Y components of a displacement vector as a function of position in the structure.

The next step 164 may then be to apply at least one of the distance-based constraint(s) computed at step 160 and the form constraint(s) computed at step 162. It should be understood that the form constraint(s) may be applied only for certain deformation iterations, certain shapes, or for pixels in certain positions of certain shapes. This may accelerate the process as the form constraints may, for instance, be less relevant, or have less of an impact, when the contour being deformed is still very small. Also, the selection of which constraints to apply may be set manually by an operator, or may be predetermined and triggered using criteria.

Figure 6:
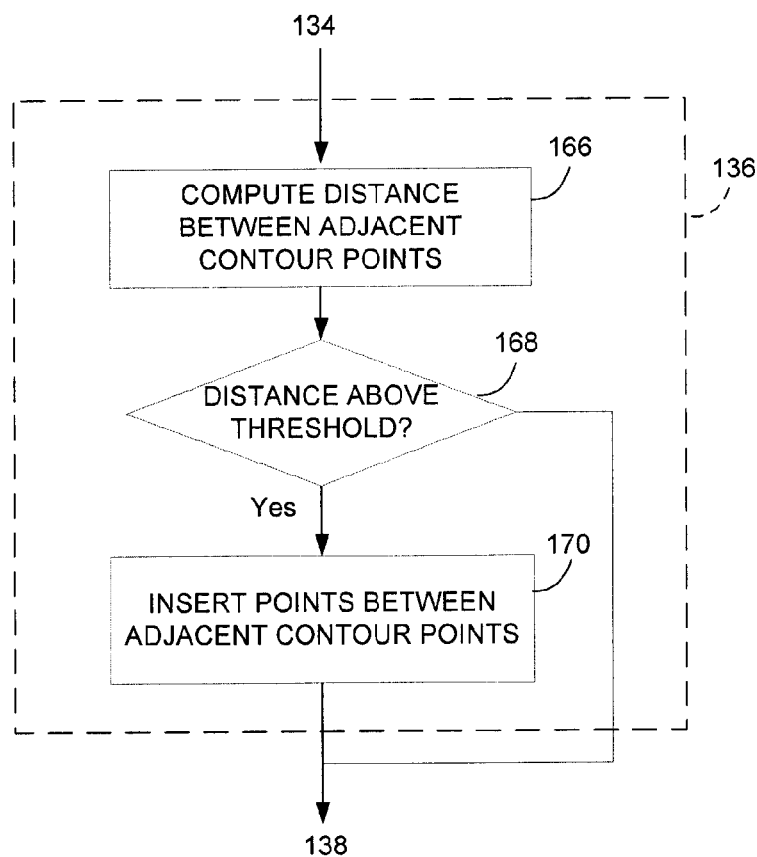
FIG. 6 is a flowchart of the step of FIG. 4a of adjusting contours.

Referring to FIG. 6, the step 136 of adjusting the contours illustratively comprises regularizing the size of the contours. Indeed, once each contour has been deformed at step 130 for M successive iterations, the size of the contour, and accordingly the spacing between points thereof, increases. It is therefore desirable to adjust the size of the contour so as to harmonize the spacing between contour points. In particular, this may involve computing at step 166 the distance between adjacent points on the current contour, and more particularly the distance between a point on the current contour and its closest neighbor. The computed distance may then be compared at step 168 to a predetermined threshold distance, e.g. 0.5 pixels to determine whether the computed distance is above the threshold. If this is not the case, i.e. the computed distance is below or equal to the threshold, this implies that the contour size has not changed beyond the acceptable tolerance and the next step 138 may then be to evaluate the end condition to determine whether additional deformation is needed. Otherwise, if the computed distance is above the threshold, this implies that the size of the contour has increased beyond the acceptable tolerance and that harmonization of the contour's size is required. In order to adjust the contour size, additional points may be inserted at step 170 between the adjacent contour points such that the distance between neighboring contour points is brought within the tolerance (i.e. below or equal to the threshold). Although not illustrated, it should be understood that points may also be removed between adjacent contour points if the distance between the adjacent contour points is too low compared to the threshold distance.

Figure 7A:
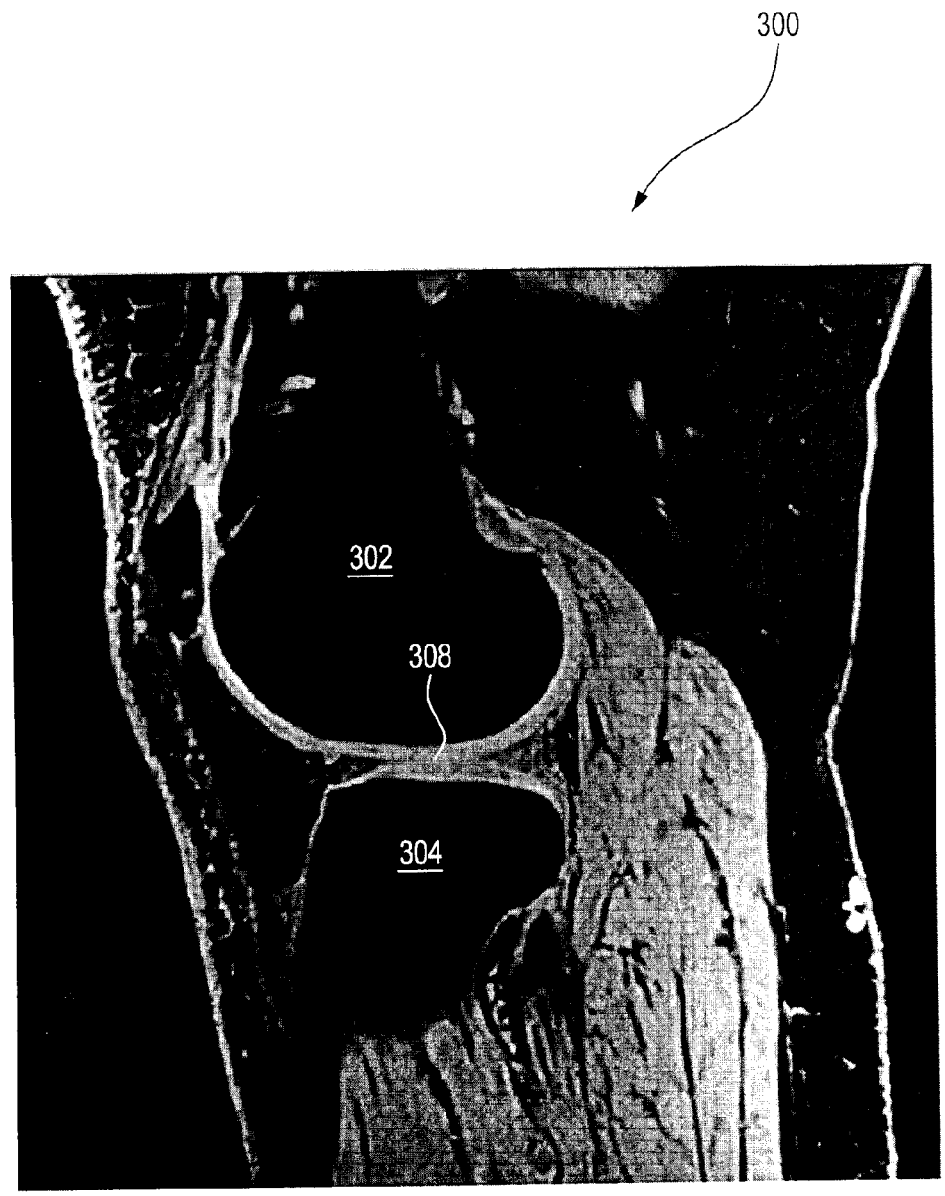
FIG. 7a is a screenshot of an image of a knee showing a femur and a tibia whose cartilage is to be segmented.
Figure 7B:
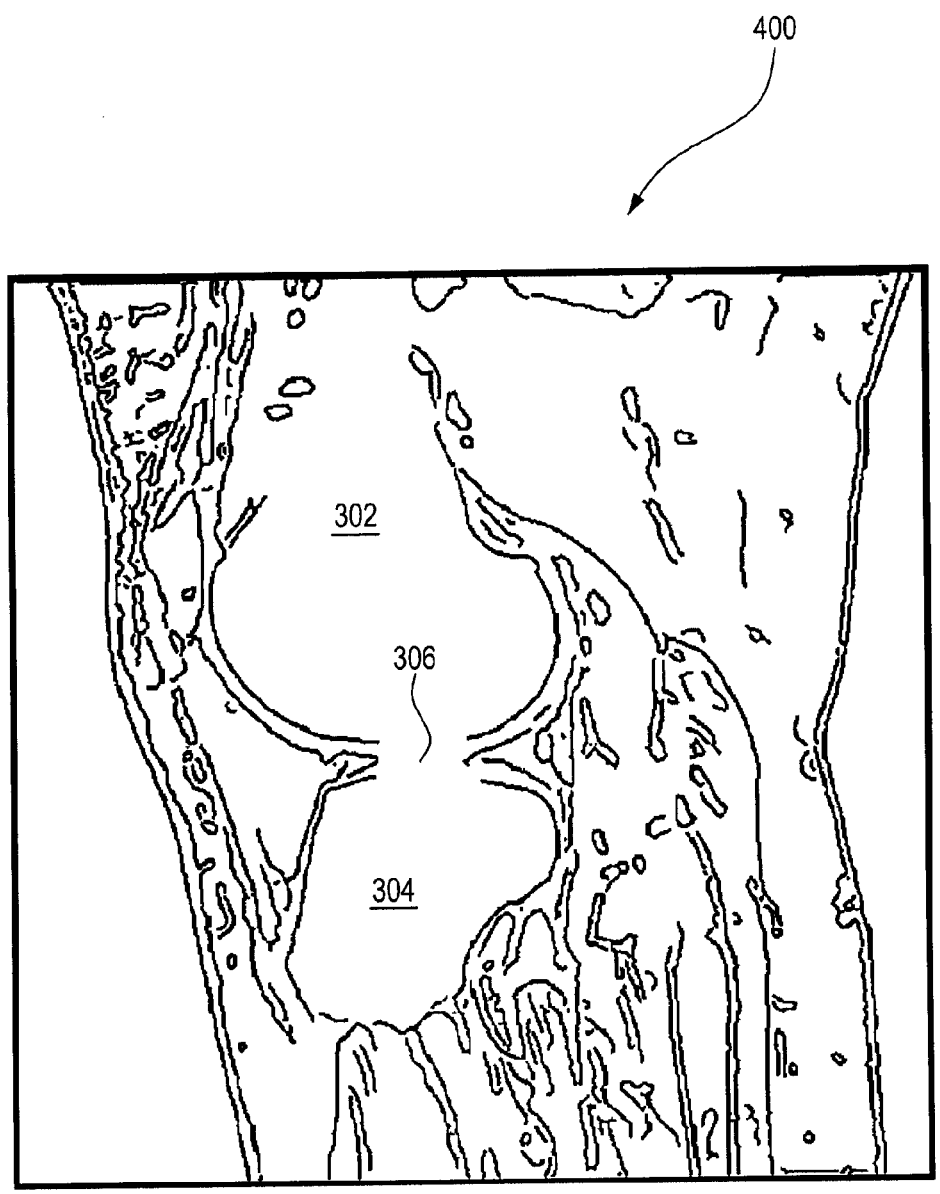

FIG. 7a is an exemplary illustration of a DICOM image 300 of a knee that is received at step 102 (described above with reference to FIG. 1). The image 300 shows structures to be segmented, namely the cartilage of a femur 302 and that of a tibia 304. FIG. 7b shows the edge image 400 corresponding to the DICOM image of FIG. 7a. As discussed above, the image 400 may be obtained after performing the pre-processing step (reference 104 of FIG. 1), and more particularly edge detection on the image 300. The edge image 400 clearly shows a hole 306 between edges delineating the femur 302 and tibia 304. This hole 306 indicates the lack of clear boundary between the cartilage (reference 308 in FIG. 7a) of the femur 302 and the tibia 304. Indeed, the cartilage tends to blend together without a clear and distinct boundary.

Figure 8A:
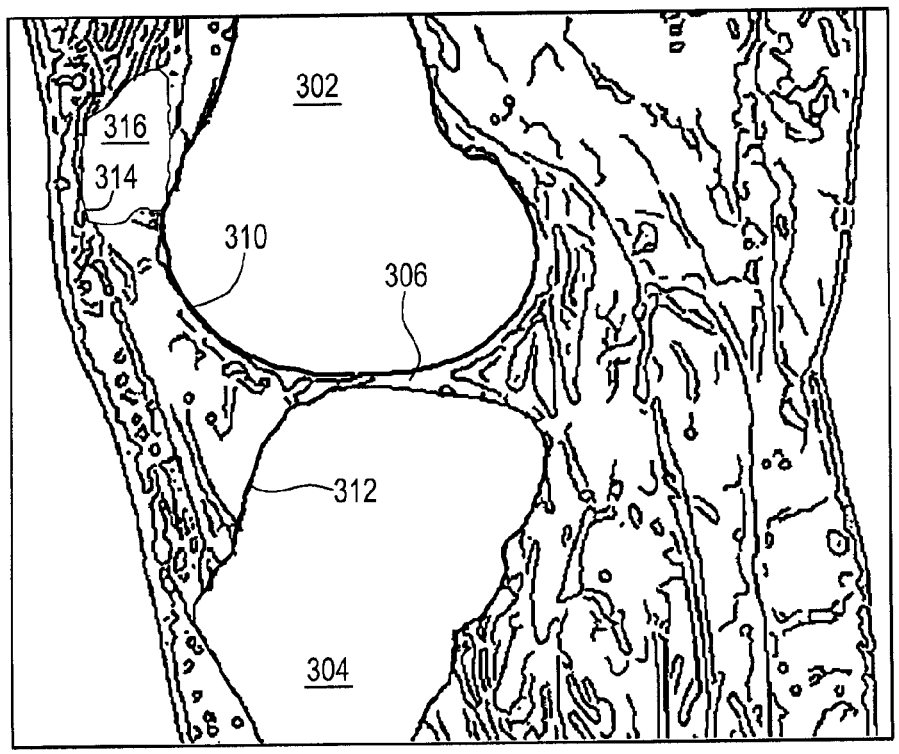
FIGS. 8a to 8c are illustrative screenshots of a first and a second contour being concurrently deformed to define the cartilage of a femur and that of a tibia.
Figure 8B:
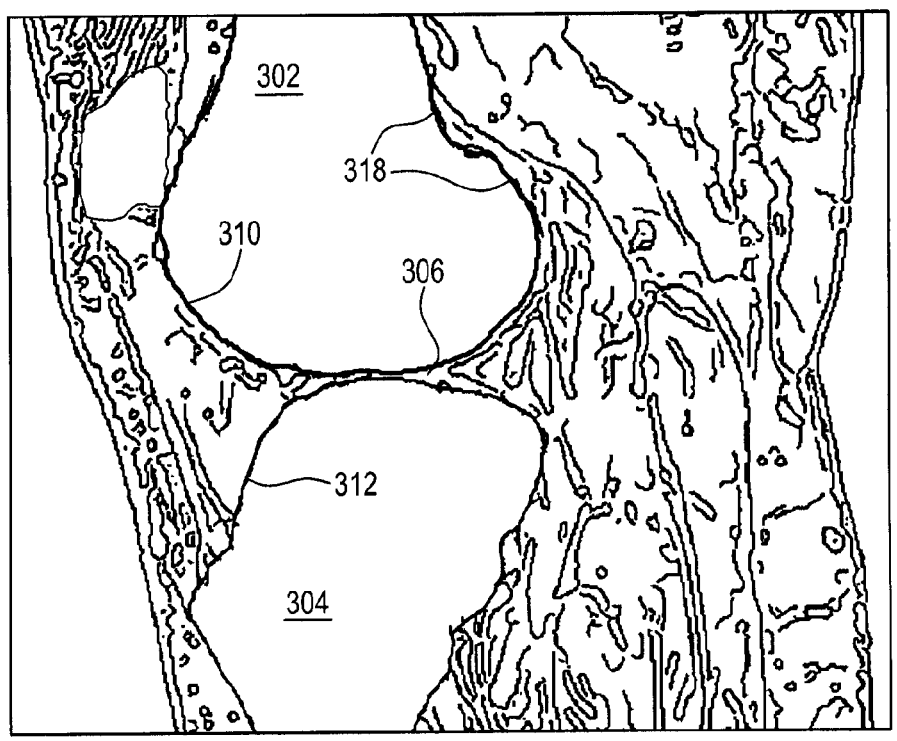
Figure 8C:
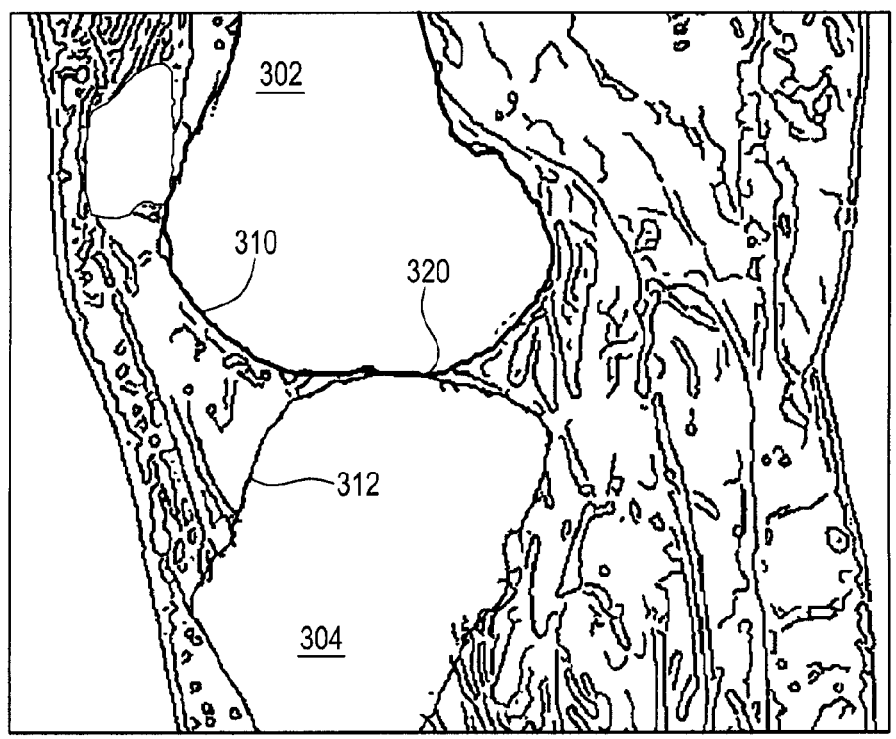

FIG. 8a to FIG. 8c show an exemplary illustration of concurrent active deformation of a contour 310 expanding inside the femur 302 and a contour 312 expanding inside the tibia 304. Although not illustrated, it should be understood that a contour 314 (see FIG. 8a) may also be deformed to expand inside the patella 316 concurrently with the contours 310 and 312. In FIG. 8a, each contour 310 and 312 is placed at an initial position received at step 106 of FIG. 1. In the illustrated embodiment, the initial position of the contours 310 and 312 is the boundary of the corresponding bone, namely the femur 302 and the tibia 304 respectively. In this initial position, there is no contact between the contours 310 and 312, especially adjacent the hole 306 between the edges of the femur 302 and the tibia 304. As discussed above, it should be understood that the initial position of the contours 310 and 312 may each be a single point positioned inside the boundary of the corresponding bone, i.e. the femur 302 and the tibia 304 respectively. In this case, several iterations of the deformation step (reference 110 in FIG. 1) may be needed to expand the initial point to the initial contour positions illustrated in FIG. 8a.

In FIG. 8b, the contours 310 and 312 have been expanded one or more times from their initial size illustrated in FIG. 8a. As can be seen from FIG. 8b, each contour approaches the edges as in 318 of the corresponding structure, e.g. the cartilage of the femur 302 or that of the tibia 304. Also, the contours 310 and 312 grow closer to one another adjacent the hole 306. Indeed, the spacing between the contours 310 and 312 tends to decrease near the hole 306 as the contours 310, 312 approach the boundary between the cartilage of the femur 302 and that of the tibia 304. During deformation of the contours 310, 312, the constraints applied to each contour point may be set locally as a function of various parameters, as discussed above. In this manner, the deformation of each contour 310, 312 may be controlled to ensure proper segmentation of the structures as well as prevent intersection of the expanding contours. For example, deformation constraints may be varied as one contour, such as contour 310, approaches an edge on one side, e.g. its right side, of the corresponding structure, such as the cartilage of the femur 302, but not on another side, e.g. its left side. Similarly, if only one part, e.g. the bottom, of one contour, such as contour 310, is still far away from an edge, constraints for pixels along this part of the contour 310 may be set to vary from those elsewhere along the contour 310 at this stage of the deformation. As such, each contour 310 or 312 may be expanded towards a portion, e.g. the bottom, of the corresponding structure to be segmented at a much higher rate than in other directions.

Figure 9A:
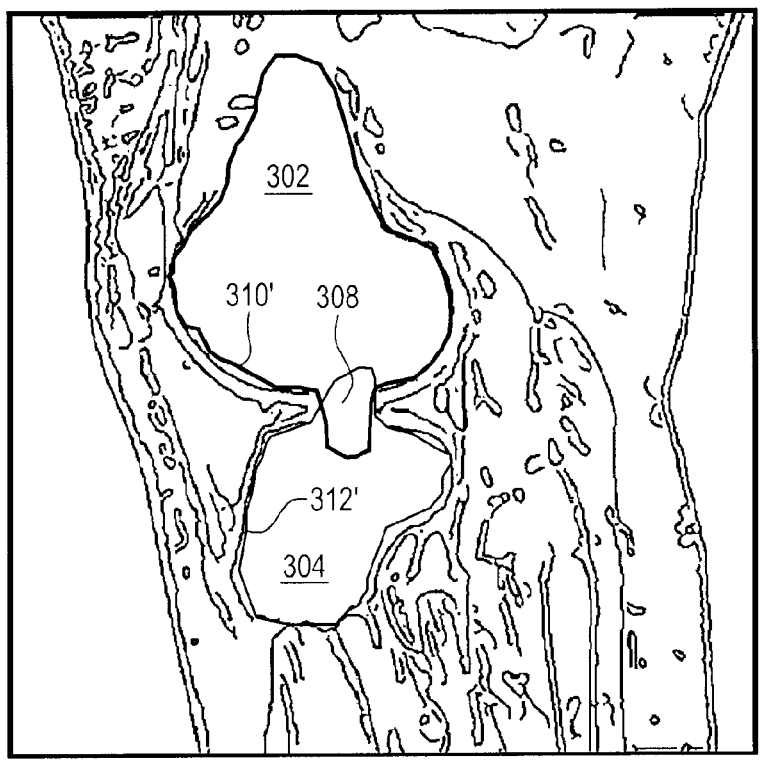
FIG. 9a and FIG. 9b are illustrative screenshots of intersecting contours.
Figure 9B:
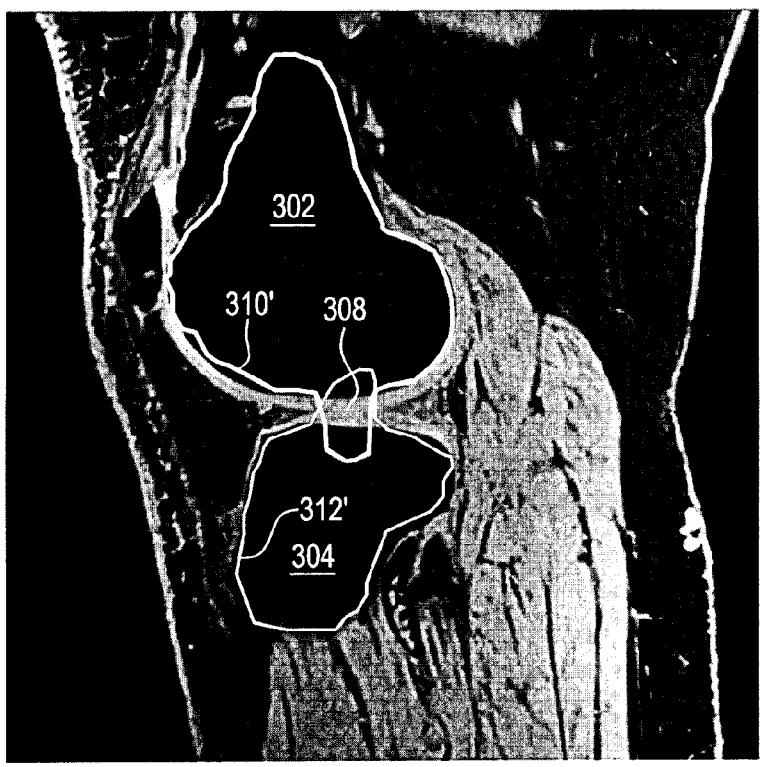

In addition, as discussed above, distance-based constrains computed at step 160 of FIG. 5d may be applied to stop the deformation of a contour as in 310 that is about to intersect another contour as in 312, thereby ensuring that expanding contours do not overlap. As can be seen in FIG. 8c, which illustrates the final iteration of the concurrent active contour deformation, application of the deformation constraints results in contours 310, 312, which appear to closely match the cartilage of the femur 302 and the tibia 304. Moreover, overlap between the contours 310, 312 is prevented by implementing the method 100. Indeed, deformation of the contours 310, 312 is stopped once the contours 310, 312 come into contact at contact point 320. In this manner, the cartilage of the femur 302 and the tibia 304 may be defined independently. As can be seen in FIG. 9a and FIG. 9b, had the contour deformation not been stopped by applying the above-mentioned constraints, overlap between the contour 310' of the cartilage of the femur 302 and the contour 312' of the cartilage of the tibia 304 would not have been prevented. As such, the resulting segmentation proves inaccurate as the contour 310' and 312' overlap at the hole 306 between edges, and accordingly in the area where the cartilage 308 tends to blend.

Figure 10:
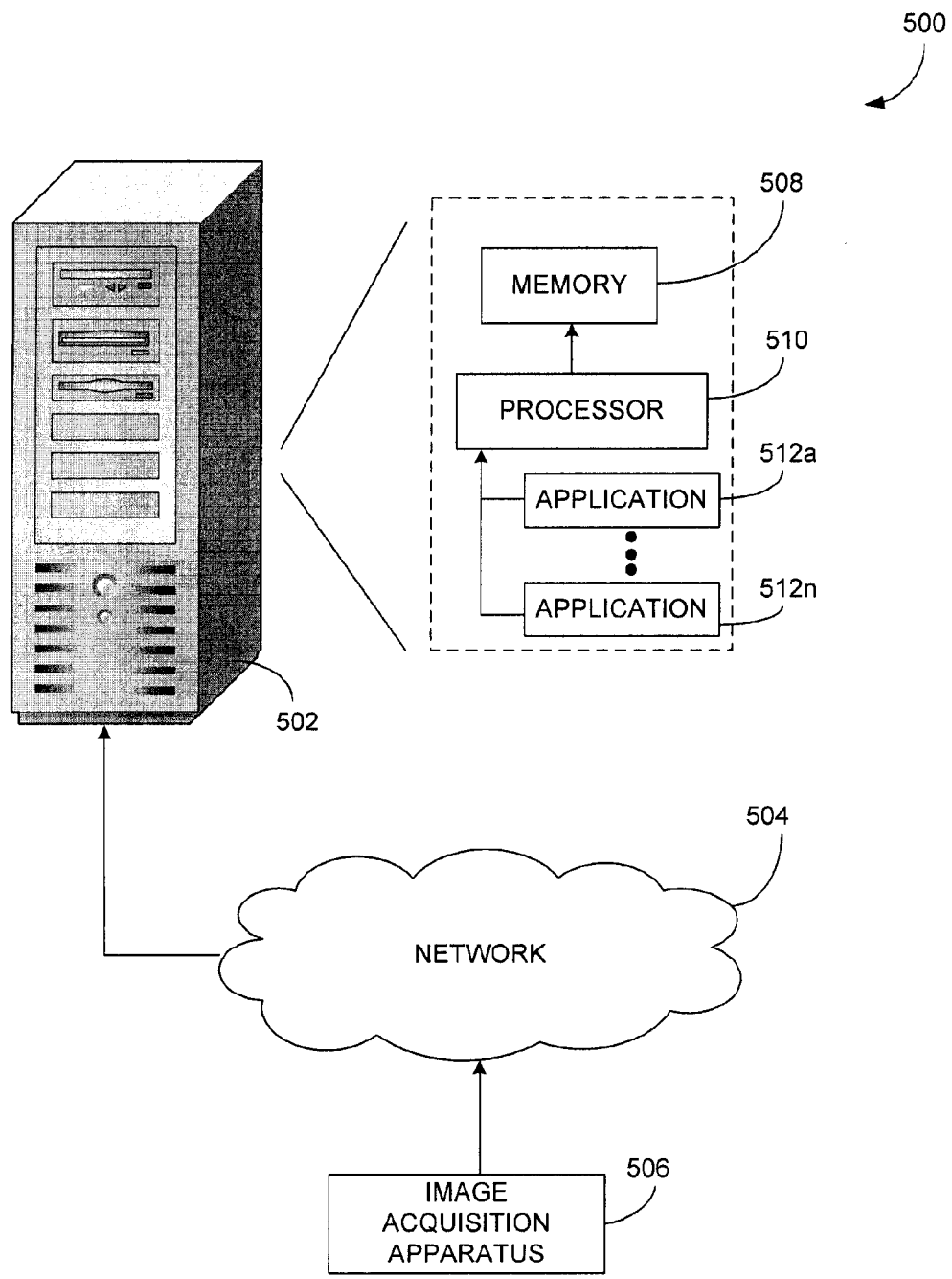
FIG. 10 is a block diagram of an exemplary system for performing concurrent active contour segmentation, in accordance with an illustrative embodiment of the present invention.

Referring now to FIG. 10, there is illustrated a system 500 for performing concurrent active contour segmentation will now be described. One or more server(s) 502 are provided remotely and accessible via a network 504. The server 502 is adapted to receive imaging data form an image acquisition apparatus 506, such as an MRI apparatus, or the like, or from another computing device (not shown). The apparatus 506 is connected to the server 502, via any type of network as in 504, such as the Internet, a cellular network, or others known to those skilled in the art.

The server 502 comprises, amongst other things, a memory 508 having coupled thereto a processor 510 on which are running a plurality of applications 512a . . . 512n. It should be understood that while the applications 512a . . . 512n presented herein are illustrated and described as separate entities, they may be combined or separated in a variety of ways. The processor 510 is illustratively represented as a single processor but may correspond to a multi-core processor or a plurality of processors operating in parallel.

One or more databases (not shown) may be integrated directly into memory 508 or may be provided separately therefrom and remotely from the server 502. In the case of a remote access to the databases, access may occur via any type of network 504, as indicated above. The various databases described herein may be provided as collections of data or information organized for rapid search and retrieval by a computer. They are structured to facilitate storage, retrieval, modification, and deletion of data in conjunction with various data-processing operations. They may consist of a file or sets of files that can be broken down into records, each of which consists of one or more fields. Database information may be retrieved through queries using keywords and sorting commands, in order to rapidly search, rearrange, group, and select the field. The databases may be any organization of data on a data storage medium, such as one or more servers.

In one embodiment, the databases are secure web servers and Hypertext Transport Protocol Secure (HTTPS) capable of supporting Transport Layer Security (TLS), which is a protocol used for access to the data. Communications to and from the secure web servers may be secured using Secure Sockets Layer (SSL). An SSL session may be started by sending a request to the Web server with an HTTPS prefix in the URL, which causes port number "443" to be placed into the packets. Port "443" is the number assigned to the SSL application on the server. Identity verification of a user may be performed using usernames and passwords for all users. Various levels of access rights may be provided to multiple levels of users.

Alternatively, any known communication protocols that enable devices within a computer network to exchange information may be used. Examples of protocols are as follows: IP (Internet Protocol), UDP (User Datagram Protocol), TCP (Transmission Control Protocol), DHCP (Dynamic Host Configuration Protocol), HTTP (Hypertext Transfer Protocol), FTP (File Transfer Protocol), Telnet (Telnet Remote Protocol), SSH (Secure Shell Remote Protocol), POP3 (Post Office Protocol 3), SMTP (Simple Mail Transfer Protocol), IMAP (Internet Message Access Protocol), SOAP (Simple Object Access Protocol), PPP (Point-to-Point Protocol), RFB (Remote Frame buffer) Protocol.

The memory 508 accessible by the processor 510 receives and stores data. The memory 508 may be a main memory, such as a high speed Random Access Memory (RAM), or an auxiliary storage unit, such as a hard disk or flash memory. The memory 508 may be any other type of memory, such as a Read-Only Memory (ROM), Erasable Programmable Read-Only Memory (EPROM), or optical storage media such as a videodisc and a compact disc.

The processor 510 may access the memory 508 to retrieve data. The processor 510 may be any device that can perform operations on data. Examples are a central processing unit (CPU), a front-end processor, a microprocessor, a graphics processing unit (GPU/VPU), a physics processing unit (PPU), a digital signal processor, and a network processor. The applications 512a . . . 512n are coupled to the processor 508 and configured to perform various tasks as explained below in more detail. An output may be transmitted to an output device (not shown) or to another computing device via the network 504.

Figure 11A:
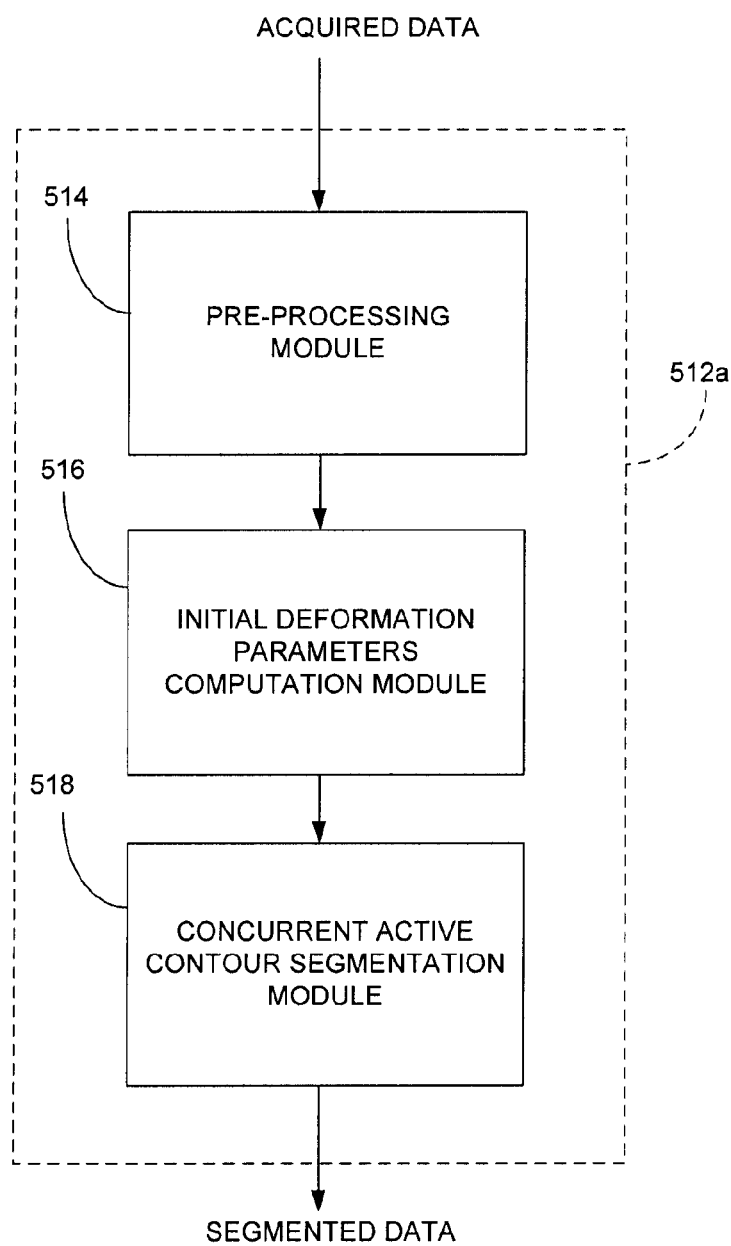
FIG. 11a is a block diagram showing an exemplary application running on the processor of FIG. 10, for performing concurrent active contour segmentation.

FIG. 11a illustrates an exemplary application 512a running on the processor 510. The application 512a comprises at least a pre-processing module 514, an initial deformation parameters computation module 516, and a concurrent active contour segmentation module 518. These modules 514, 516, 518 interact together in order to provide segmented data from imaging data acquired by the image acquisition apparatus (reference 506 in FIG. 10). The acquired data is received at the pre-processing module 514 and processed in accordance with the flowcharts of FIG. 1 to FIG. 6 in order to generate segmented data. In particular, the pre-processing module 514 may process the acquired data by performing the anisotropic filtering and edge detection steps discussed above with respect to FIG. 2a. The output of the pre-processing module 514 is illustratively edge image data, which is fed to the initial deformation parameters computation module 516. From the edge image data, the initial deformation parameters computation module 516 may then perform the steps of computing the contour normal, the vector fields, and the magnitude of the vector fields, as discussed above with reference to FIG. 3. The data output by the initial deformation parameters computation module 516 is then fed to the concurrent active contour segmentation module 518, which then outputs the segmented data.

Figure 11B:
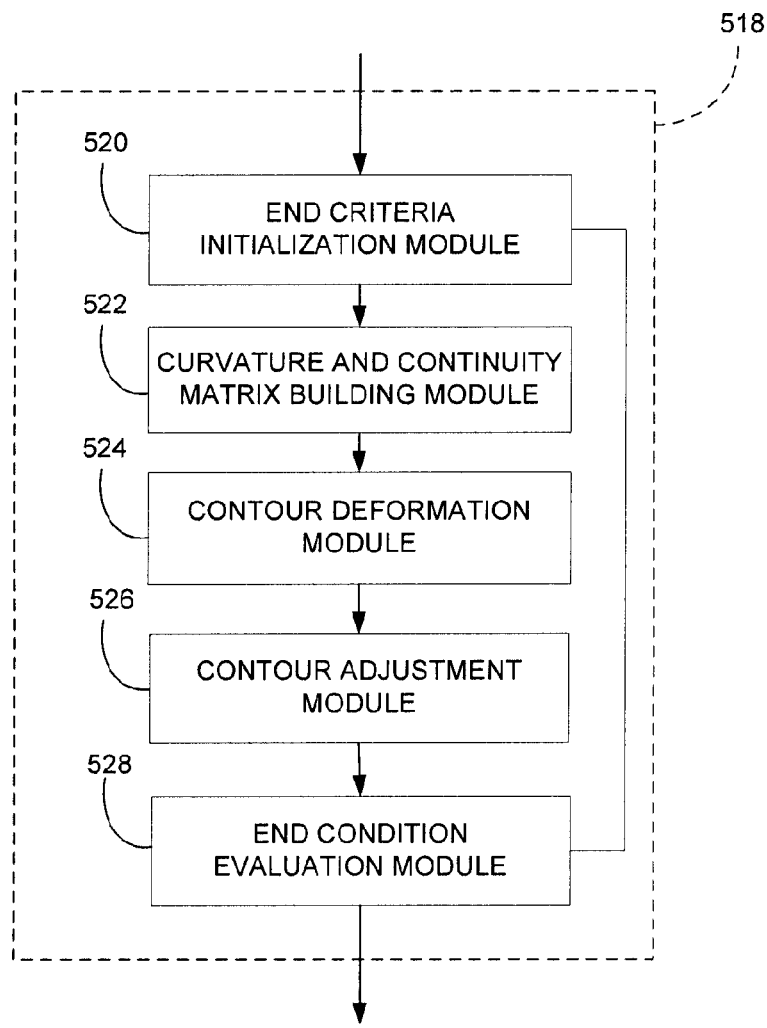

FIG. 11b illustrates an exemplary embodiment of the concurrent active contour segmentation module 518, which may comprise an end criteria initialization module 520, a curvature and continuity matrix building module 522, a contour deformation module 524, a contour adjustment module 526, and an end condition evaluation module 528. The end criteria initialization module 520 is used to initialize the end criteria according to a predetermined tolerance for the rate of change of the distance between consecutive contours, as discussed above. The curvature and continuity matrix building module 522 may then compute the curvature and continuity matrix that manages continuity and curvature constraints. The constraints are applied at each contour point for a given iteration to ensure adequate continuity and curvature of the contour and allow contour points to be positioned within some contour holes while avoiding others.

The contour deformation module 524 may then be used to perform concurrent deformation of active contours, as will be discussed further below. Once the contours have been deformed, the contour adjustment module 526 may be used to regularize the size of the expanded contours, as discussed above. The end condition evaluation module 528 may then evaluate the end condition by comparing the distance between two (2) consecutive expanded contours to the end criteria initialized by the module 520. If the distance is within the tolerance, the end condition is satisfied and no additional deformation is needed. If the end condition is not satisfied, the end condition evaluation module 528 sends the image data back to the end criteria initialization module 520 to initiate a new deformation process. The end condition evaluation module 528 may further determine the number of iterations of contour deformation performed to date by the contour deformation module 524 and compare this number to a predetermined value, e.g. N, to determine whether the end condition is satisfied, as discussed above with respect to FIG. 4a.

Figure 11C:
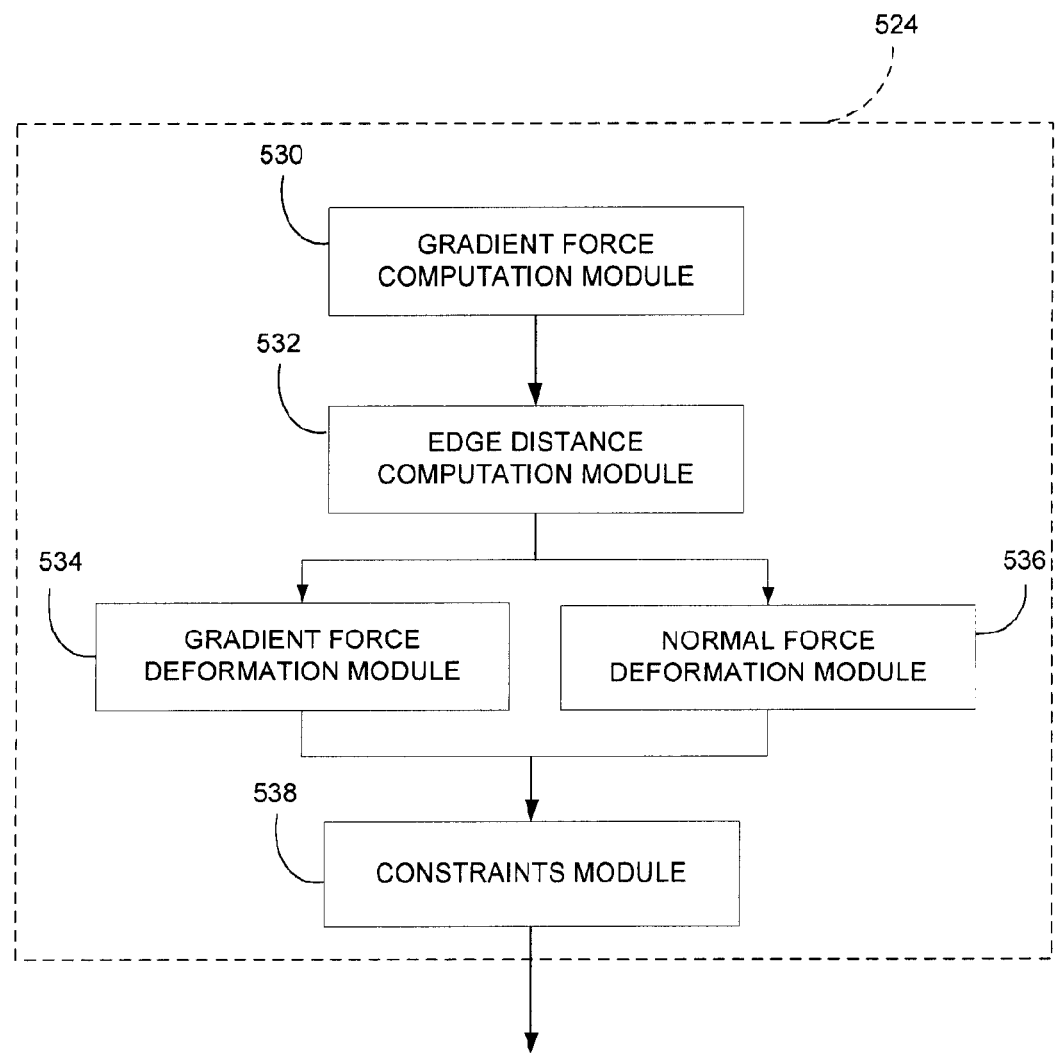
FIG. 11c is a block diagram showing an exemplary contour deformation module of FIG. 11b.

FIG. 11c is an exemplary embodiment of the contour definition module 524, which illustratively comprises a gradient force computation module 530, an edge distance computation module 532, a gradient force deformation module 534, a normal force deformation module 536, and a constraints module 538. The gradient force computation module 530 is used to compute the gradient force in the edge image data while the edge distance computation module 532 is used to compute the distance between each contour point and one or more edges in the edge image data. Using the computed edge distance, the edge distance computation module 532 may then determine whether the contour is close to or far from the edges, and accordingly whether the gradient force or the normal force may be used to deform the contour, as discussed above. If it is determined that the contour is close to the edges and that the gradient force should be used, the image data is sent to the gradient force deformation module 534. Alternatively, the image data is sent to the normal force deformation module 536 if it is determined that the contour is far from the edges and that normal force should be used. The constraints module 538 may then be used to compute and apply one or more constraints, e.g. form constraints or distance-based constraints, to each contour point.

Figure 11D:
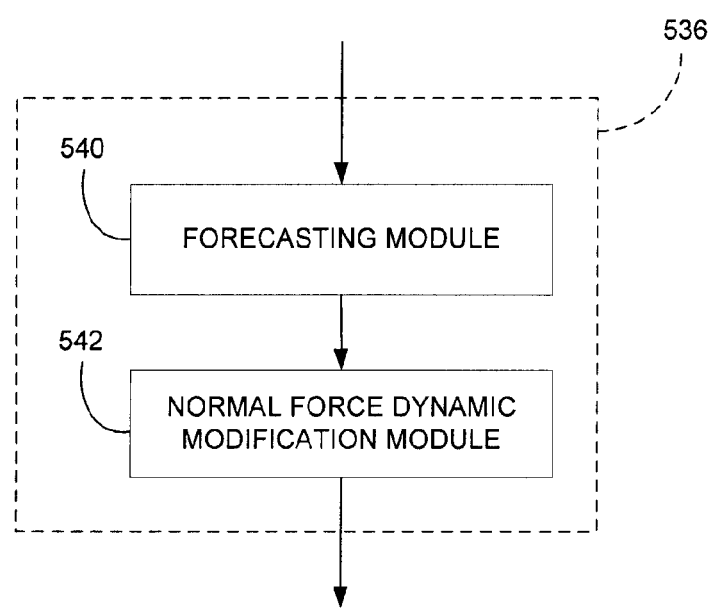
FIG. 11d is a block showing an exemplary normal force deformation module of FIG. 11c.

As shown in FIG. 11d, the normal force deformation module 530 illustratively comprises a forecasting module 540 and a normal force modification module 542. As discussed above with reference to FIG. 5b, the forecasting module 540 may be used to predict the displacement direction relative to the contour normal as well as identify whether edges of interest are present in the displacement direction. The normal force modification module 542 may then be used to dynamically modify the normal force according to the distance between a point on the current contour and edges of the image. Various embodiments for implementing the steps of FIG. 4a using the contour deformation module 524 of FIG. 11b will be readily understood by those skilled in the art.

While illustrated in the block diagrams as groups of discrete components communicating with each other via distinct data signal connections, it will be understood by those skilled in the art that the present embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present embodiment.

It should be noted that the present invention can be carried out as a method, can be embodied in a system, and/or on a computer readable medium. The embodiments of the invention described above are intended to be exemplary only. The scope of the invention is therefore intended to be limited solely by the scope of the appended claims.

The invention claimed is:

1. A computer-implemented method for active contour segmentation of imaging data, the method comprising:
receiving an image of a first structure and at least a second structure;
receiving a first initial position on the image for the first structure and at least a second initial position on the image for the at least second structure;
setting the first initial position as a first initial contour and the at least second initial position as an at least second initial contour; and
concurrently and iteratively deforming the first initial contour and the at least second initial contour to respectively expand into a first expanded contour matching a shape of the first structure and at least a second expanded contour matching a shape of the at least second structure by applying one or more constraints to each point of the first initial contour and the at least second initial contour, a selected one of the one or more constraints being applied for preventing the first initial contour and at least one of the at least second initial contour from intersecting one another upon being deformed, and updating the one or more constraints after each iteration,
wherein the one or more constraints comprises one or more deformation constraints and one or more form constraints to be applied at each point along at least one of the first initial contour and the at least second initial contour.

2. The method of claim 1, wherein receiving the image comprises receiving the image of the first structure and the at least second structure, the first and at least second structure contiguous.

3. The method of claim 1, wherein deforming the first initial contour and the at least second initial contour by applying the selected constraint comprises, for each point of each one of the first initial contour and the at least second initial contour:
computing a minimum distance between the point and at least another one of the first initial contour and the at least second initial contour;
comparing the minimum distance to a first threshold;
if the minimum distance is greater than the first threshold, setting a current position of the point in the image to be equal to a previous position held by the point at a previous iteration and stopping deformation of the one of the first initial contour and the at least second initial contour; and
otherwise, pursuing the deformation.

4. The method of claim 1, wherein deforming the first initial contour and the at least second initial contour comprises computing said one or more form constraints in order to modify a displacement strength of each point in accordance with the shape of a corresponding one of the first structure and the at least second structure and with a current position of the point within the corresponding one of the first structure and the at least second structure in the image, and applying the one or more form constraints to the point.

5. The method of claim 1, wherein deforming the first initial contour and the at least second initial contour comprises computing said one or more deformation constraints to be applied at each point along at least one of the first initial contour and the at least second initial contour in order to achieve a desired curvature for the at least one of the first initial contour and the at least second initial contour, and applying the one or more deformation constraints to the point.

6. The method claim 1, further comprising detecting one or more edges in the image and wherein deforming the first initial contour and the at least second initial contour by applying the one or more constraints comprises:
computing a value of a gradient force at each point along the one of the first initial contour and the at least second initial contour;
computing a fourth distance between the one or more edges and each point along the one of the first initial contour and the at least second initial contour;
comparing the fourth distance to a fourth threshold;
if the fourth distance is greater than the fourth threshold, using a force normal to the one of the first initial contour and the at least second initial contour at each point along the one of the first initial contour and the at least second initial contour to displace the one of the first initial contour and the at least second initial contour; and
otherwise, using the gradient force to displace the one of the first initial contour and the at least second initial contour.

7. The method of claim 6, wherein using the normal force to displace the one of the first initial contour and the at least second initial contour comprises:
determining a displacement direction of each point along the one of the first initial contour and the at least second initial contour;
for each point along the one of the first initial contour and the at least second initial contour, identifying ones of the one or more edges present in the displacement direction;
discriminating between ones of the one or more edges present in the displacement direction that delineate a boundary of a corresponding one of the first structure and the second structure and ones of the one or more edges present in the displacement direction and representative of noise in the image; and
adjusting the normal force in accordance with the fourth distance between each point along the one of the first initial contour and the at least second initial contour and the edges present in the displacement direction such that a displacement strength of the point in the displacement direction causes the one of the first initial contour and the at least second initial contour to be displaced beyond the edges present in the displacement direction and representative of noise.

8. The method of claim 7, wherein discriminating comprises discriminating between the one or more edges on the basis of at least one of a length of each of the one or more edges, a ratio of the length of each of the one or more edges to a size of an image area containing the edge, a curvature of each of the one or more edges, and an intensity of pixels forming each of the one or more edges.

9. The method of claim 7, further comprising computing a spacing between the one or more edges present in the displacement direction, comparing the spacing to a tolerance, and, if the spacing is below the tolerance, adjusting the normal force such that the displacement strength of the point in the displacement direction prevents the current contour from entering the spacing between the one or more edges.

10. The method of claim 1, further comprising, after each iteration and for each point on the first initial contour and on the at least second initial contour, identifying a closest neighboring point, computing a second distance between the point and the closest neighboring point, comparing the second distance to a second threshold, and, if the second distance is above the second threshold, inserting one or more points between the point and the closest neighboring point for bringing the second distance below the second threshold.

11. The method of claim 1, wherein deforming the first initial contour and the at least second initial contour by applying the one or more constraints comprises:
- computing a third distance between two consecutive deformations of each one of the first initial contour and the at least second initial contour;
- determining a rate of change of the third distance over a predetermined number of iterations;
- comparing the rate of change to a third threshold;
- if the rate of change is above the third threshold, further deforming the one of the first initial contour and the at least second initial contour to bring the third distance below the third threshold; and
- otherwise, stopping deformation of the one of the first initial contour and the at least second initial contour at a current iteration.

12. The method of claim 11, wherein, if the rate of change is above the third threshold, further deforming comprises deforming the one of the first initial contour and the at least second initial contour for at most a predetermined number of supplementary iterations.

13. The method of claim 1, wherein receiving the first initial position and the second initial position comprises one of receiving a user-defined selection of the first and the at least second initial positions and randomly determining a first point in the image inside a boundary of the first structure and a second point in the image inside a boundary of the second structure.

14. A system for active contour segmentation of imaging data, the system comprising:
- a memory;
- a processor; and
- at least one application stored in the memory and executable by the processor for
  - receiving an image of a first structure and at least a second structure,
  - receiving a first initial position on the image for the first structure and at least a second initial position on the image for the at least second structure,
  - setting the first initial position as a first initial contour and the at least second initial position as an at least second initial contour, and
  - concurrently and iteratively deforming the first initial contour and the at least second initial contour to respectively expand into a first expanded contour matching a shape of the first structure and at least a second expanded contour matching a shape of the at least second structure by applying one or more constraints to each point of the first initial contour and the at least second initial contour, a selected one of the one or more constraints being applied for preventing the first initial contour and at least one of the at least second initial contour from intersecting one another upon being deformed, and updating the one or more constraints after each iteration,
- wherein the one or more constraints comprises one or more deformation constraints and one or more form constraints to be applied at each point along at least one of the first initial contour and the at least second initial contour.

15. The system of claim 14, wherein the at least one application is executable by the processor for receiving the image comprising receiving the image of the first structure and the at least second structure, the first and at least second structure contiguous.

16. The system of claim 14, wherein the at least one application is executable by the processor for deforming the first initial contour and the at least second initial contour by applying the selected constraint comprising, for each point of each one of the first initial contour and the at least second initial contour:
- computing a minimum distance between the point and at least another one of the first initial contour and the at least second initial contour;
- comparing the minimum distance to a first threshold;
- if the minimum distance is greater than the first threshold, setting a current position of the point in the image to be equal to a previous position held by the point at a previous iteration and stopping deformation of the one of the first initial contour and the at least second initial contour; and
- otherwise, pursuing the deformation.

17. The system of claim 14, wherein the at least one application is executable by the processor to compute said one or more form constraints in order to modify a displacement strength of each point in accordance with the shape of a corresponding one of the first structure and the at least second structure and with a current position of the point within the corresponding one of the first structure and the at least second structure in the image, and applying the one or more form constraints to the point.

18. The system of claim 14, wherein the at least one application is executable by the processor to compute said one or more deformation constraints in order to achieve a desired curvature for the at least one of the first initial contour and the at least second initial contour, and applying the one or more deformation constraints to each point.

19. The system of claim 14, wherein the at least one application is executable by the processor for detecting one or more edges in the image and for deforming the first initial contour and the at least second initial contour by applying the one or more constraints comprising:
- computing a value of a gradient force at each point along the one of the first initial contour and the at least second initial contour;
- computing a fourth distance between the one or more edges and each point along the one of the first initial contour and the at least second initial contour;
- comparing the fourth distance to a fourth threshold;
- if the fourth distance is greater than the fourth threshold, using a force normal to the one of the first initial contour and the at least second initial contour at each point along the one of the first initial contour and the at least second initial contour to displace the one of the first initial contour and the at least second initial contour; and
- otherwise, using the gradient force to displace the one of the first initial contour and the at least second initial contour.

20. The system of claim 19, wherein the at least one application is executable by the processor for using the normal force to displace the one of the first initial contour and the at least second initial contour comprising:

determining a displacement direction of each point along the one of the first initial contour and the at least second initial contour;

for each point along the one of the first initial contour and the at least second initial contour, identifying ones of the one or more edges present in the displacement direction;

discriminating between ones of the one or more edges present in the displacement direction that delineate a boundary of a corresponding one of the first structure and the second structure and ones of the one or more edges present in the displacement direction and representative of noise in the image; and adjusting the normal force in accordance with the fourth distance between each point along the one of the first initial contour and the at least second initial contour and the edges present in the displacement direction such that a displacement strength of the point in the displacement direction causes the one of the first initial contour and the at least second initial contour to be displaced beyond the edges present in the displacement direction and representative of noise.

21. The system of claim 20, wherein the at least one application is executable by the processor for computing a spacing between the one or more edges present in the displacement direction, comparing the spacing to a tolerance, and, if the spacing is below the tolerance, adjusting the normal force such that the displacement strength of the point in the displacement direction prevents the current contour from entering the spacing between the one or more edges.

22. The system of claim 14, wherein the at least one application is executable by the processor for, after each iteration and for each point on the first initial contour and on the at least second initial contour, identifying a closest neighboring point, computing a second distance between the point and the closest neighboring point, comparing the second distance to a second threshold, and, if the second distance is above the second threshold, inserting one or more points between the point and the closest neighboring point for bringing the second distance below the second threshold.

23. The system of claim 14, wherein the at least one application is executable by the processor for deforming the first initial contour and the at least second initial contour by applying the one or more constraints comprising:

computing a third distance between two consecutive deformations of each one of the first initial contour and the at least second initial contour;

determining a rate of change of the third distance over a predetermined number of iterations;

comparing the rate of change to a third threshold;

if the rate of change is above the third threshold, further deforming the one of the first initial contour and the at least second initial contour to bring the third distance below the third threshold; and otherwise, stopping deformation of the one of the first initial contour and the at least second initial contour at a current iteration.

24. The system of claim 23, wherein the at least one application is executable by the processor for, if the rate of change is above the third threshold, further deforming comprising deforming the one of the first initial contour and the at least second initial contour for at most a predetermined number of supplementary iterations.

25. The system of claim 14, wherein the at least one application is executable by the processor for receiving the first initial position and the second initial position comprising one of receiving a user-defined selection of the first and the at least second initial positions and randomly determining a first point in the image inside a boundary of the first structure and a second point in the image inside a boundary of the second structure.

26. A non-transitory computer readable medium having stored thereon program code executable by a processor for active contour segmentation of imaging data, the program code executable for:

receiving an image of a first structure and at least a second structure;

receiving a first initial position on the image for the first structure and at least a second initial position on the image for the at least second structure;

setting the first initial position as a first initial contour and the at least second initial position as an at least second initial contour; and concurrently and iteratively deforming the first initial contour and the at least second initial contour to respectively expand into a first expanded contour matching a shape of the first structure and at least a second expanded contour matching a shape of the at least second structure by applying one or more constraints to each point of the first initial contour and the at least second initial contour, a selected one of the one or more constraints being applied for preventing the first initial contour and at least one of the at least second initial contour from intersecting one another upon being deformed, and updating the one or more constraints after each iteration, wherein the one or more constraints comprises one or more deformation constraints and one or more form constraints to be applied at each point along at least one of the first initial contour and the at least second initial contour.

* * * * *

UNITED STATES PATENT AND TRADEMARK OFFICE
CERTIFICATE OF CORRECTION

PATENT NO. : 9,607,241 B2
APPLICATION NO. : 14/782826
DATED : March 28, 2017
INVENTOR(S) : Geoffroy Rivet-Sabourin It is certified that error appears in the above-identified patent and that said Letters Patent is hereby corrected as shown below:

On the Title Page

Please change "Assignee: LABORATORIES BODYCAD INC.," to -- "Assignee: LABORATOIRES BODYCAD INC., --

In the Specification

In Column 3, Lines 11-12, please change "discrimating comprises discrimating" to -- discriminating comprises discriminating --

In Column 16, Line 15, please change "data form" to -- data from --

In the Claims

In Claim 6 (Column 20, Line 7), please change "method claim" to -- method of claim --

Signed and Sealed this
Thirteenth Day of June, 2017

Joseph Matal
*Performing the Functions and Duties of the*
*Under Secretary of Commerce for Intellectual Property and*
*Director of the United States Patent and Trademark Office*